US009097339B2

(12) United States Patent
Skogward

(10) Patent No.: US 9,097,339 B2
(45) Date of Patent: Aug. 4, 2015

(54) SHIFT FORK ASSEMBLY

(75) Inventor: Kenneth Skogward, Huskvarna (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 154 days.

(21) Appl. No.: 13/635,265

(22) PCT Filed: Apr. 6, 2011

(86) PCT No.: PCT/IB2011/000754
§ 371 (c)(1),
(2), (4) Date: Sep. 14, 2012

(87) PCT Pub. No.: WO2011/124975
PCT Pub. Date: Oct. 13, 2011

(65) Prior Publication Data
US 2013/0000437 A1 Jan. 3, 2013

Related U.S. Application Data

(60) Provisional application No. 61/321,218, filed on Apr. 6, 2010.

(51) Int. Cl.
*F16H 63/32* (2006.01)

(52) U.S. Cl.
CPC .......... *F16H 63/32* (2013.01); *F16H 2063/321* (2013.01); *F16H 2063/322* (2013.01);
(Continued)

(58) Field of Classification Search
CPC .............. F16H 63/32; F16H 2063/321; F16H 2063/322; F16H 2063/325
USPC ......................................... 74/473.37, 473.36
See application file for complete search history.

(56) References Cited

U.S. PATENT DOCUMENTS 1,749,837 A * 3/1930 Nickell, Jr. ...................... 74/334
2,277,675 A * 3/1942 Blackburn ................... 192/3.62
(Continued)

FOREIGN PATENT DOCUMENTS

DE 3735090 C2 5/1990
DE 10159441 A1 6/2003
(Continued)

OTHER PUBLICATIONS

English language abstract and original document for DE102006001229 A1 extracted from the espacenet.com database on Nov. 9, 2012, 14 pages.
(Continued)

*Primary Examiner* — Justin Krause
*Assistant Examiner* — Gregory Prather
(74) *Attorney, Agent, or Firm* — Howard & Howard Attorneys PLLC

(57) ABSTRACT

A shift fork assembly (120, 120a, 120b, 120c, 120d) including a shift rail member (122, 122a, 122c, 122d) having a slot (188) defined therein and a shift rail axis (24), and a fork member (126, 126b, 126c, 126d) mounted in the slot and carried by the shift rail member. The fork member and shift rail member have movement relative to each other. The fork member has pivoting motion relative to the shift rail member about a pivot axis (206) that extends substantially perpendicularly relative to the shift rail axis, and the pivot axis is adapted to extend substantially between the shift rail axis and a gear axis (48). Also a method for assembling a shift fork assembly (120, 120a, 120b, 120c, 120d) including the steps of: introducing a finger (128, 129) of a fork member (126, 126b, 126c, 126d) into a slot (188) in a shift rail member (122, 122a, 122c, 122d); interfitting the fork and shift rail members by disposing a received portion (212) of one into a receiving portion (174) of the other and capturing the received portion in the receiving portion; positioning a stop member (214, 250, 300) relative to a first one of the shift rail and fork members; establishing a supporting contact site between the shift rail and fork members with the stop member; and capturing the second one of the shift rail and fork members between limits of motion relative to the first one of the shift rail and fork members.

21 Claims, 19 Drawing Sheets

(52) U.S. Cl.
CPC ..... *F16H2063/325* (2013.01); *Y10T 29/49826* (2015.01); *Y10T 74/20177* (2015.01); *Y10T 74/20183* (2015.01)

(56) References Cited

U.S. PATENT DOCUMENTS

| | | | | |
|---|---|---|---|---|
| 2,608,273 | A * | 8/1952 | Roos | 184/11.1 |
| 2,719,440 | A * | 10/1955 | Banker | 74/731.1 |
| 3,878,926 | A * | 4/1975 | Adachi | 192/18 R |
| 3,915,027 | A * | 10/1975 | Simmons et al. | 74/473.1 |
| 3,929,029 | A * | 12/1975 | Kelbel | 74/473.21 |
| 4,265,587 | A * | 5/1981 | Clark | 414/723 |
| 4,279,175 | A * | 7/1981 | Breed et al. | 74/473.21 |
| 4,449,416 | A * | 5/1984 | Huitema | 74/336 R |
| 4,529,080 | A * | 7/1985 | Dolan | 192/109 A |
| 4,531,623 | A | 7/1985 | Arai et al. | |
| 4,633,725 | A * | 1/1987 | Jones | 74/473.1 |
| 4,856,362 | A * | 8/1989 | Jester | 74/473.24 |
| 5,002,297 | A * | 3/1991 | Klein | 280/279 |
| 5,094,121 | A * | 3/1992 | von Kaler | 74/473.27 |
| 5,562,011 | A * | 10/1996 | Bartus | 74/473.24 |
| 5,586,470 | A * | 12/1996 | Bailly et al. | 74/473.25 |
| 5,743,147 | A * | 4/1998 | Gazyakan | 74/473.25 |
| 5,988,009 | A * | 11/1999 | Tornatore et al. | 74/473.27 |
| 6,038,938 | A * | 3/2000 | Szczepanski et al. | 74/473.24 |
| 6,082,514 | A * | 7/2000 | Averill | 192/69.42 |
| 6,179,040 | B1 | 1/2001 | Aoki et al. | |
| 6,196,507 | B1 * | 3/2001 | Morin et al. | 248/231.51 |
| 6,318,206 | B1 | 11/2001 | Kramer et al. | |
| 6,389,919 | B1 * | 5/2002 | Hennequet et al. | 74/473.37 |
| 6,619,153 | B2 * | 9/2003 | Smith et al. | 74/473.37 |
| 6,729,200 | B2 * | 5/2004 | Paetzold | 74/473.25 |
| 7,311,015 | B2 * | 12/2007 | Kluge | 74/337.5 |
| 7,353,726 | B2 * | 4/2008 | Beer et al. | 74/340 |
| 7,441,477 | B2 * | 10/2008 | Ho | 74/473.37 |
| 7,581,467 | B2 * | 9/2009 | Peterman et al. | 74/606 R |
| 7,597,024 | B2 * | 10/2009 | Matsuda | 74/473.36 |
| 7,707,905 | B2 * | 5/2010 | Haka | 74/473.25 |
| 7,810,627 | B2 * | 10/2010 | Saitoh | 192/219.5 |
| 7,814,806 | B2 * | 10/2010 | DeVore et al. | 74/335 |
| 8,037,780 | B2 * | 10/2011 | Caenazzo et al. | 74/473.37 |
| 8,286,526 | B2 * | 10/2012 | Englund et al. | 74/473.37 |
| 8,342,053 | B2 * | 1/2013 | Matsushita et al. | 74/473.36 |
| 8,413,537 | B2 * | 4/2013 | Garabello et al. | 74/473.37 |
| 8,505,403 | B2 * | 8/2013 | Bowen et al. | 74/335 |
| 8,549,948 | B2 * | 10/2013 | Hoering et al. | 74/473.37 |
| 8,746,098 | B2 * | 6/2014 | Bowen et al. | 74/330 |
| 8,776,631 | B2 * | 7/2014 | Hada et al. | 74/473.37 |
| 2003/0084739 | A1 * | 5/2003 | Koerber et al. | 74/335 |
| 2003/0094057 | A1 * | 5/2003 | Bigi | 74/473.37 |
| 2004/0108168 | A1 * | 6/2004 | Bathe et al. | 184/6.12 |
| 2004/0177714 | A1 * | 9/2004 | Ronge | 74/473.37 |
| 2005/0223833 | A1 * | 10/2005 | Ewing et al. | 74/473.1 |
| 2006/0005654 | A1 * | 1/2006 | Ehrlich et al. | 74/473.1 |
| 2007/0209466 | A1 * | 9/2007 | Garabello et al. | 74/473.37 |
| 2008/0017469 | A1 * | 1/2008 | Iwasaki et al. | 192/48.5 |
| 2008/0178700 | A1 * | 7/2008 | Harmos et al. | 74/473.37 |
| 2008/0295634 | A1 * | 12/2008 | Olds et al. | 74/473.37 |
| 2011/0138958 | A1 * | 6/2011 | Kirchner | 74/473.25 |
| 2014/0283641 | A1 * | 9/2014 | Neelappa | 74/473.33 |

FOREIGN PATENT DOCUMENTS

| | | | | |
|---|---|---|---|---|
| DE | 102004053894 | A1 * | 5/2006 | F16H 61/32 |
| DE | 102005051383 | A1 | 5/2007 | |
| DE | 102006001229 | A1 | 7/2007 | |
| EP | 1213513 | A1 | 6/2002 | |
| EP | 1472478 | B1 | 8/2005 | |
| EP | 1612459 | A1 * | 1/2006 | F16H 63/32 |
| GB | 1287250 | | 6/1971 | |
| WO | WO2008116736 | * | 10/2008 | |

OTHER PUBLICATIONS

English language abstract (machine translation provided by espacenet.com) and original document for DE102005051383 A1 extracted from the espacenet.com database on Nov. 9, 2012, 12 pages.

English language abstract and original document for DE102004053894 A1 extracted from the espacenet.com database on Nov. 9, 2012, 11 pages.

Original document for DE102006001229 A1 and English language abstract of corresponding FR2833060 A1 extracted from the espacenet.com database on Nov. 9, 2012, 14 pages.

English language abstract and original document for EP1213513 A1 extracted from the espacenet.com database on Nov. 9, 2012, 11 pages.

English language abstract extracted from the espacenet.com database on Nov. 13, 2012, English language machine translation extracted from the espacenet.com database on Mar. 28, 2011, and original document for DE3735090 C2, 12 pages.

International Search Report and Written Opinion for PCT/IB2011/000754 mailed Jul. 4, 2011, 10 pages.

* cited by examiner

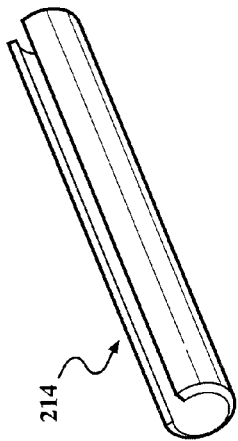
FIG. 11
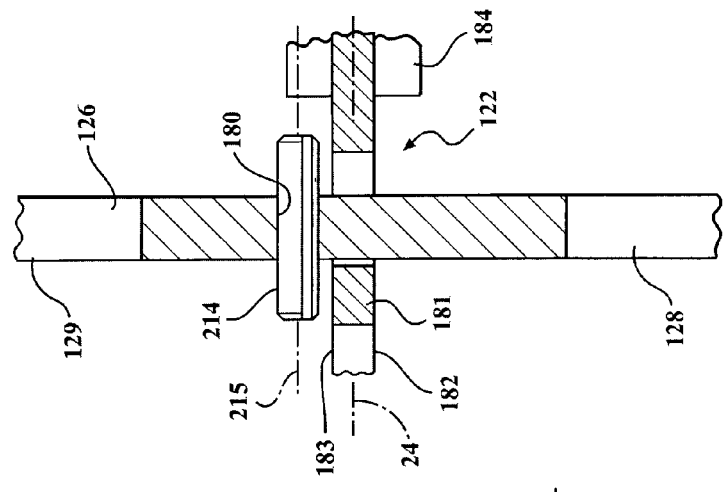
FIG. 14
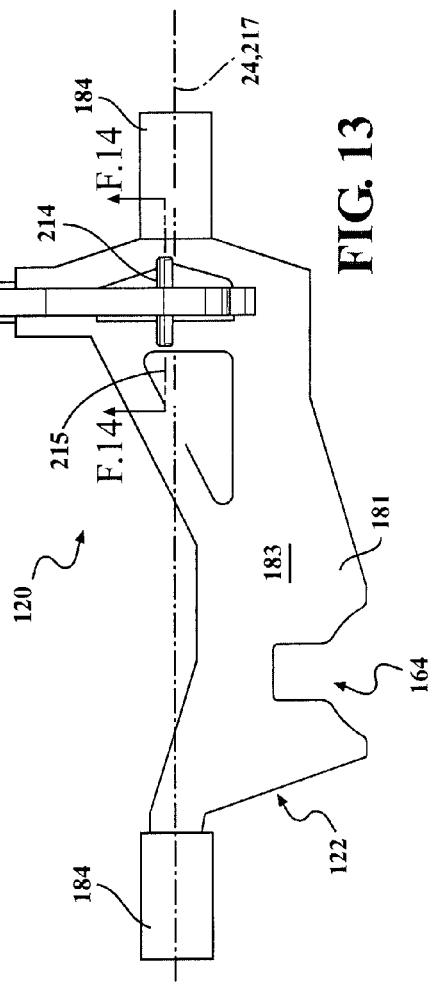
FIG. 12
FIG. 13

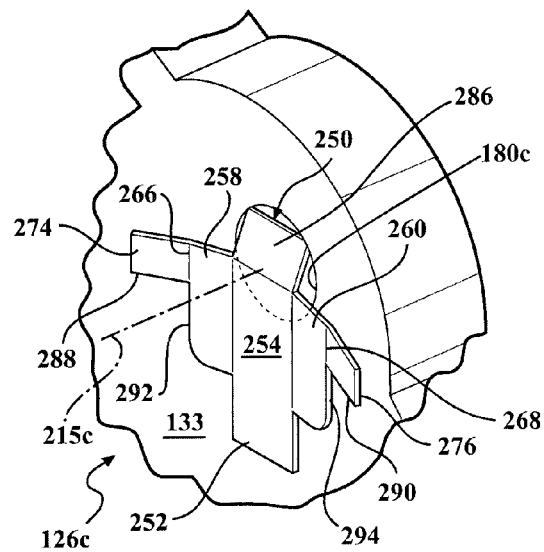
FIG. 21
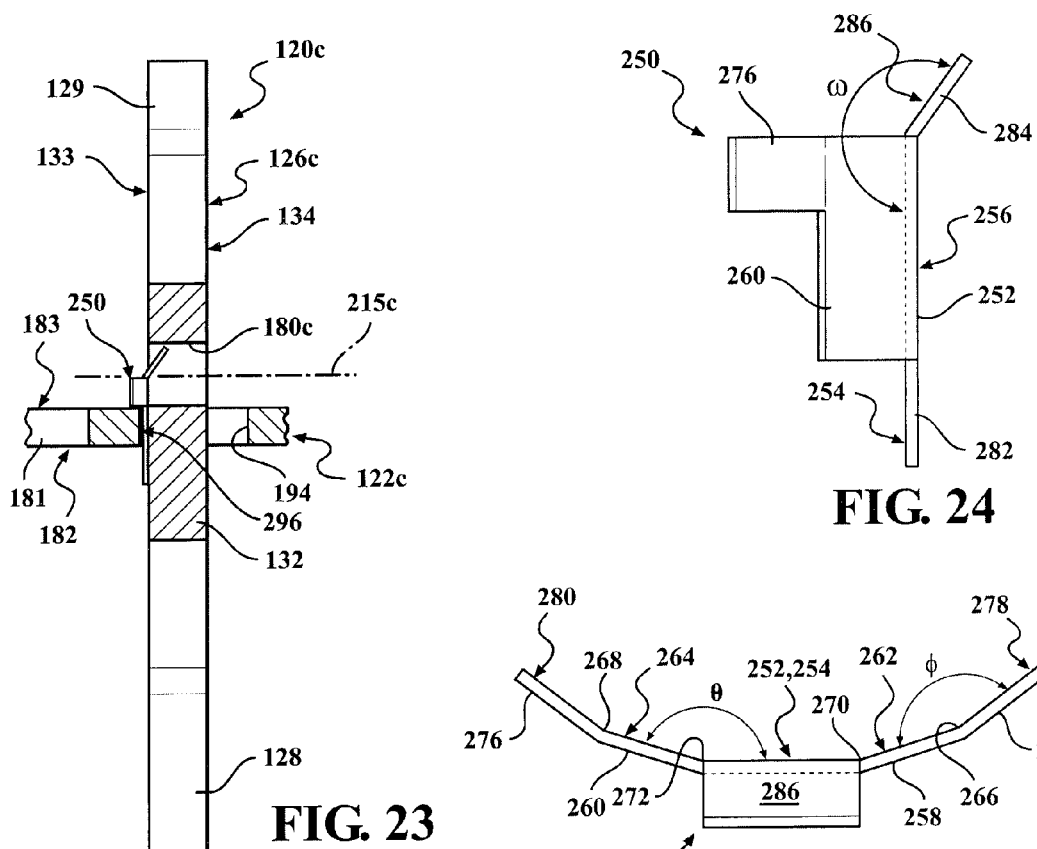
FIG. 23
FIG. 24
FIG. 25

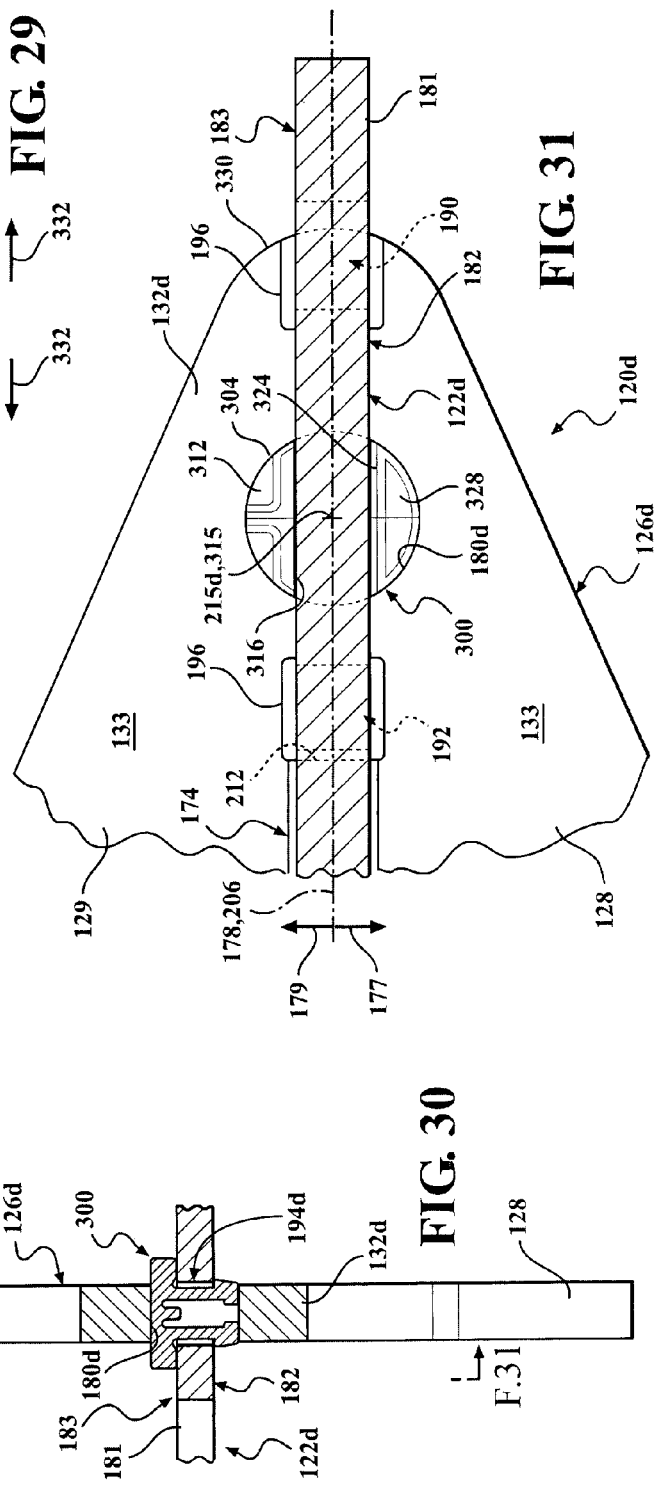

000754, which was filed on Jun. 4, 2011 with the World Intellectual Property Organization, the disclosure of which is hereby incorporated by reference.

SHIFT FORK ASSEMBLY

The subject patent application claims priority to and all the benefits of International Application No. PCT/IB2011/000754, which was filed on Jun. 4, 2011 with the World Intellectual Property Organization, the disclosure of which is hereby incorporated by reference.

CROSS-REFERENCE TO RELATED APPLICATION

This application claims priority to U.S. Provisional Application No. 61/321,218 entitled SHIFT FORK ASSEMBLY, filed Apr. 6, 2010, the complete disclosure of which is incorporated herein by reference.

BACKGROUND OF THE INVENTION a. Field of the Invention

The present invention relates to gear change actuation mechanisms, and particularly to gear shift forks therefor.

b. Description of the Related Art

It is common in gear change mechanism arrangements that gear engagement or ratio changes are actuated through a shift fork, the movement of which is effected by the operator or driver through a gear change lever, for example. FIGS. 1-2 show an example prior shift fork assembly, through which movement of the shown control ring of a gear change mechanism in a transmission or gearbox is effected.

Shift fork assembly 20 comprises first cylindrical shift rail member 22 that extends along shift rail member axis 24, and shift fork structure 26 that moves along axis 24. Fork structure 26 is defined by a pair of fingers 28, 29 that define therebetween a U-shaped opening 30. First and second fingers 28, 29 are joined at fork hub section 32, which is fixed to tubular sleeve 34. Cylindrical sleeve 34 is slidably disposed about cylindrical shift rail member 22 and limits relative pivotable motion between rail member 22 and fork structure 26 to a single degree of freedom, i.e., about axis 24. Distal ends 36 of fingers 28, 29 terminate in control ring engaging tips 38, which may be molded of a resilient material and define laterally opposed abutting surfaces 40. With fork assembly 20 installed, tips 38 are disposed in circumferential groove 42 of control ring 44 defined by opposing axial side surfaces 46 separated by a groove floor 47. Each surface 40 interfaces one of the opposing axial groove side surfaces 46.

Control ring 44 moves axially along and rotatably about axis 48 and is part of the dog clutch of a gear change mechanism 56 housed within the gearbox. Referring to FIG. 3, which depicts an exemplary prior gear change mechanism 56 and gear shifter shaft assembly 57 to which an embodiment of a shift fork assembly according to the present invention has been adapted, control ring 44 is at all times rotatably fixed to gear shaft 49; in a selective first position along axis 48, the control ring 44 engages shaft 49 and coaxial first gear 50 of a first set of gears, thereby rotatably fixing shaft 49 and first gear 50 together, as is known in the art. In its shown selective second or neutral position 52, the control ring 44 does not interengage shaft 49 and any gear set. Notably, the control ring 44 may have a selective third position along axis 48 in which it engages shaft 49 and coaxial second gear 54 of a second set of gears. The control ring 44 thus may be selectively moved along its gate between its second or neutral position 52, and its first position for engagement with the first gear 50 or its third position for engagement with the second gear 54, as is well known in the art.

Referring again to FIG. 2, control ring 44 is rotatable about axis 48, and the resilient material of control ring engaging tips 38 is selected from known materials commonly used in such applications to decrease wear between abutting surfaces 40 and the walls 46 of the groove 42, and to reduce the stiffness of the connection between the fork assembly 20 and the control ring 44. By means of its connection with fork assembly 20, control ring 44 is held free to rotate relative to fork structure 26 about axis 48, but maintained fixed in its axial position along gear axis 48.

Fork structure 26 of shift fork assembly 20 includes bracket 58 having a first end 60 that is fixed to sleeve 34, and an opposite second end 62 provided with an open ended slot 64 open towards a direction generally perpendicular to shift rail member axis 24. Shifter shaft assembly 57 (shown in FIG. 3) includes shift finger 66 fixed to shift rod 68 which extends along and is pivotable about and axially moveable along axis 70. An end of shift rod 68 projects outside of the gearbox, and fixed to shift rod 68 external to the gear box is shift lever 72. The axial and rotational movements shift rod 68 are controlled by the operation of shift lever 72, which, in turn, is controlled by the operator or vehicle driver by a suitable means known in the art and not discussed further herein.

Controlled axial movement of shift rod 68 selectively disposes shift finger 66 in one of a plurality of different axially aligned slots 64, each slot associated with a different shifter gate and shift fork assembly 20 associated with other sets of gears. Upon movement of rod 68 in the axial direction along axis 70, its shift finger 66 moves between a number of different shift fork assemblies 20, each associated with a respective shift gate and control ring 44, the shift finger 66 received in different ones of an aligned plurality of open ended slots 64. Each of these slots 64 is associated with a fork assembly 20 corresponding to a respective shift gate. Each of the plurality of shift gates 20 has a control ring neutral position 52 (in which their slots 64 are aligned for receipt of shift finger 66), and at least one control ring gear-engaging position into which the control ring is moved by shift finger 66 in response to rotation of the shift rod 68 about its axis 70 from its neutral orientation.

Thus, the axial displacement of the shift control ring 44 along gear axis 48 in its respective gate is actuated by the rotational movement of the shift rod 68 about shift axis 70 when the shift finger 66 is correspondingly positioned axially in the slot 64 of the shift fork assembly of that gate. With rotation of shift rod 68 about axis 70, the shown control ring 44 is moved between a first, gear engaging position in which it partially overlaps and engages both shaft 49 and first gear 50 (shown in FIG. 3) associated with a first gear set, and a second or neutral position 52 (shown in FIG. 3) in which it engages shaft 49 only. Control ring 44 may also be moved along gear axis 48 between a third, gear engaging position in which shift control ring 44 partially overlaps and engages both shaft 49 and second gear 54 (shown in FIG. 3) associated with a second gear set, and the second or neutral position 52. In the second or neutral position 52, control ring 44 is out of engagement with both the first gear 50 and the second gear 54, and in its corresponding angular position (i.e., in its neutral orientation) shift rod 68 may be moved axially along axis 70 to dispose shift finger 66 in the aligned slot 64 of another gate's shift fork assembly.

Thus, pivoting movement of the shift lever 72 by the driver to the desired gear within a gate results in the associated shift control ring 44 being moved between its neutral position and the corresponding first and/or second gear position.

If the shift control ring 44 does not mesh correctly into its first or second gear position, it may come to wobble. Prior shift fork assemblies do not have sufficient degrees of freedom to accommodate wobbling movement of control ring 44, and because this wobbling movement is not accommodated by the shift fork assembly, it may exhibit undesirable wear, noise and vibration characteristics when such wobbling movement is encountered. In prior shift fork assembly 20, for example, abnormal wear may occur between the incorrectly meshing shift control ring 44 and the abutting surfaces 40 of its shift fork structure 26. More importantly, the wobbling movement results in undesirable noise and vibration being transferred from shift fork structure 26 to the driver.

A prior approach to accommodating wobbling movement of a shift control ring is disclosed in EP 1 213 513 A1, which describes a fork member pivotably connected to an axially moved shift rail member. The shift rail is substantially cylindrical and provided with an axial section having diametrically opposed flats, over which the fork member is positioned. The fork member has a hub portion from which a pair of control ring-engaging fingers extend to surround the control ring central axis. In the hub portion is provided a slot defined by a pair of interfacing, parallel planar surfaces that slidably cooperate with the shift rail flats. The fork member slot extends through the hub portion in a direction along the shift rail and control ring central axes, and opens tangentially relative to the control ring central axis. A first bore extends through the shift rail flats, laterally relative to the shift rail axis, and appears to intersect the shift rail axis. A corresponding second bore extends through the side of the fork member hub portion opposite the opening defined by the fork fingers, through the parallel planar surfaces of the slot, and into the hub portion between the fingers. The first bore is larger than the second bore, and a dowel extends along the first and second bore, the dowel having a loose fit to the first bore in the shift rail and being press-fitted into both portions of the second bore in the fork member hub portion. The sliding fit between the dowel and the first bore accordingly permits a small amount of pivotal movement of the fork member relative to the shift rail about the central axis of the dowel. Notably, the disclosed structure results in a mounting structure in which the interfaces of the dowel and the fork are very small and may result in extensive wear of the parts and/or locking of the pivotal movement when the terminal ends of the fork fingers are subjected to substantial forces. Moreover, all forces exerted axially, in directions parallel with shift rail and control ring movement, between the shift rail and the fork member, are transferred in shear through the intermediary dowel, rather than directly between the shift rail and the fork member. Failure of the dowel or its dislodgement from its bores will almost certainly adversely affect shifter performance.

Thus, there is a need for an improved shift fork mounting structure which mitigates the problems of the above-described, prior arrangements.

SUMMARY OF THE INVENTION

The invention mitigates the above identified problems by introducing a shift fork member that is pivotally mounted into a shift rail member, and accommodates wobbling movement of the control ring, if exhibited, to which it is operably engaged, thereby improving the wear, noise and vibration characteristics of the gear change actuation mechanism.

The present invention provides a shift fork assembly including a shift rail member having a slot defined therein and a shift rail axis along which the shift rail member has axial movement, and a fork member mounted in the slot and carried by the shift rail member. The fork member and shift rail member have movement relative to each other, and the fork member is adapted to operatively engage a control ring and induce movement of the control ring along a gear axis substantially parallel to the shift rail axis with movement of the shift rail member. The fork member has pivoting motion relative to the shift rail member about a pivot axis that extends substantially perpendicularly relative to the shift rail axis, and the pivot axis is adapted to extend substantially between the shift rail axis and the gear axis.

The present invention also provides a method for assembling a shift fork assembly including the steps of: introducing one of a pair of fingers of a fork member into a slot in a shift rail member; interfitting the fork member and the shift rail member by disposing a received portion of one into a receiving portion of the other and capturing the received portion in the receiving portion; positioning a stop member relative to a first one of the shift rail member and fork member; establishing a supporting contact site between the shift rail member and the fork member with the stop member; and capturing the second one of the shift rail member and fork member between limits of motion relative to the first one of the shift rail member and fork member.

BRIEF DESCRIPTION OF THE DRAWINGS

To accomplish the above and related objects, the invention may be embodied in the forms illustrated in the accompanying drawings, attention being called to the fact, however, that the drawings are illustrative only, and that changes may be made in the specific constructions illustrated. Moreover, it is to be noted that the accompanying drawings are not necessarily drawn to scale or to the same scale. In particular, the scale of some of the elements of the drawings may be exaggerated to emphasize characteristics of the elements.

Various other objects, features and attendant advantages of the present invention will become fully appreciated as the same becomes better understood when considered in conjunction with the accompanying drawings, in which like reference characters designate the same, similar or corresponding parts throughout the several views, and wherein:

FIG. 11 is a perspective view of a stop member component in the form of an elongate, rolled spring pin;

FIG. 12 is an enlarged view of encircled area F.12 in FIG. 10;

FIG. 13 is plan view of the fully assembled shift fork assembly of FIG. 10;

FIG. 14 is a partial view of a cross-section of the shift fork assembly of FIG. 13 taken along line F.14-F.14;

FIG. 21 is an enlarged view of encircled area F.21 of FIG. 20, with the shift rail member removed, showing the stop member positioned relative to the shift fork member;

FIG. 23 is a partial view of a cross-section of the shift fork assembly of FIG. 20, taken along line F.23-F.23;

FIG. 24 is a side view of the stop member of the shift fork assembly shown in FIG. 21;

FIG. 25 is a plan view of the stop member of FIG. 24;

FIG. 28 is a perspective view of the stop member shown in the shift fork assembly of FIGS. 26 and 27;

FIG. 29 is a side view of the stop member of FIG. 28;

FIG. 30 is an enlarged partial view of a cross-section of the shift fork assembly of FIG. 27 taken along line F.30-F.30; and FIG. 31 is a further-enlarged, partial view of a cross-section of the shift fork assembly of FIG. 30 taken along line F.31-F.31.

Figure 1:
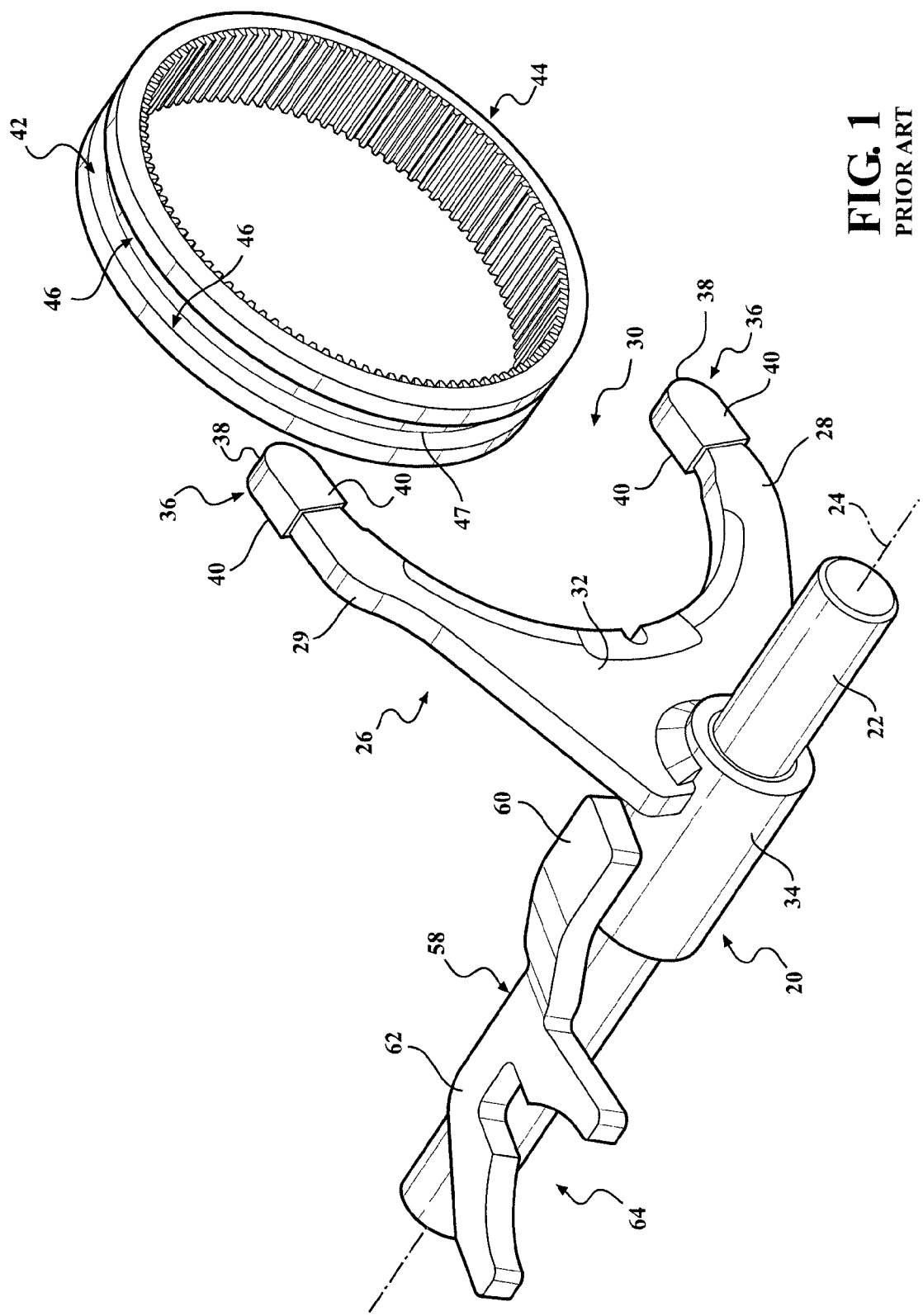
FIG. 1 is an exploded view of a prior shift fork assembly and a gear shift control ring of a gear change mechanism.
Figure 2:
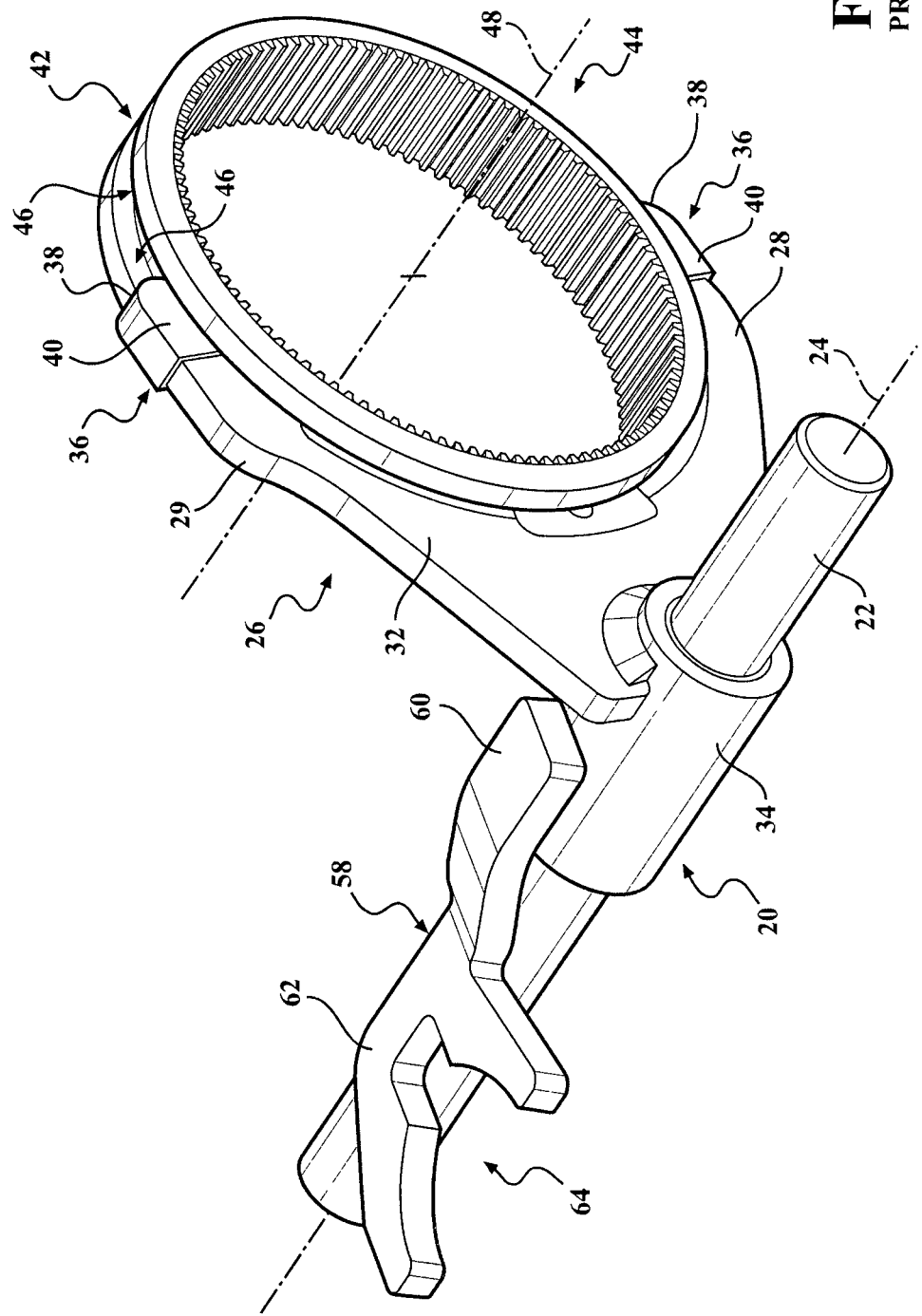
FIG. 2 is a perspective view of the prior shift fork assembly of FIG. 1 shown operably engaged with shift control ring of FIG. 1.

While the invention is susceptible to various modifications and alternative forms, specific embodiments thereof are shown by way of example in the drawings and may herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF EXEMPLARY EMBODIMENTS

Figure 3:
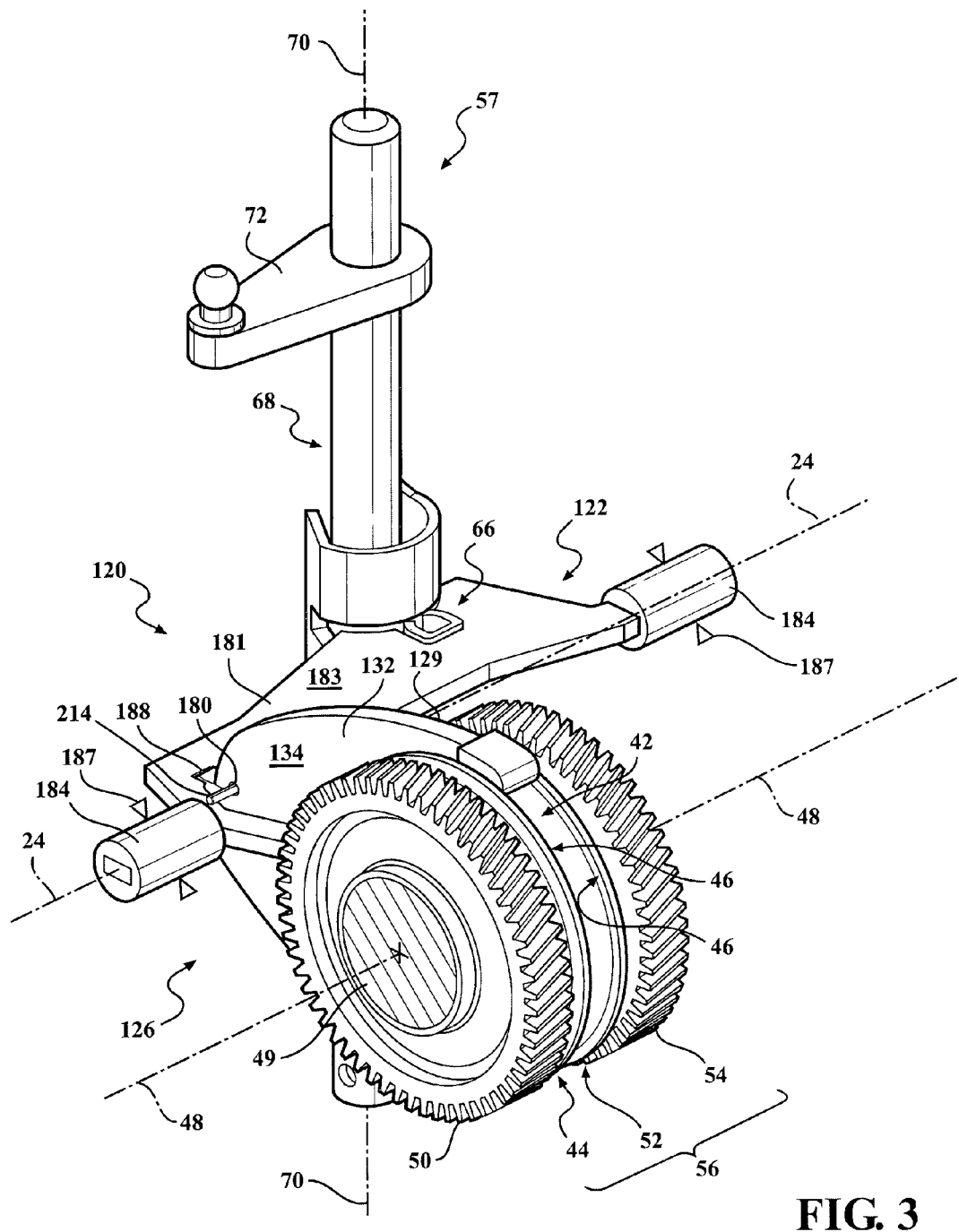
FIG. 3 is a perspective view of a first embodiment shift fork assembly shown operably engaged with a prior gear shifter shaft assembly and a prior gear change mechanism.
Figure 4:
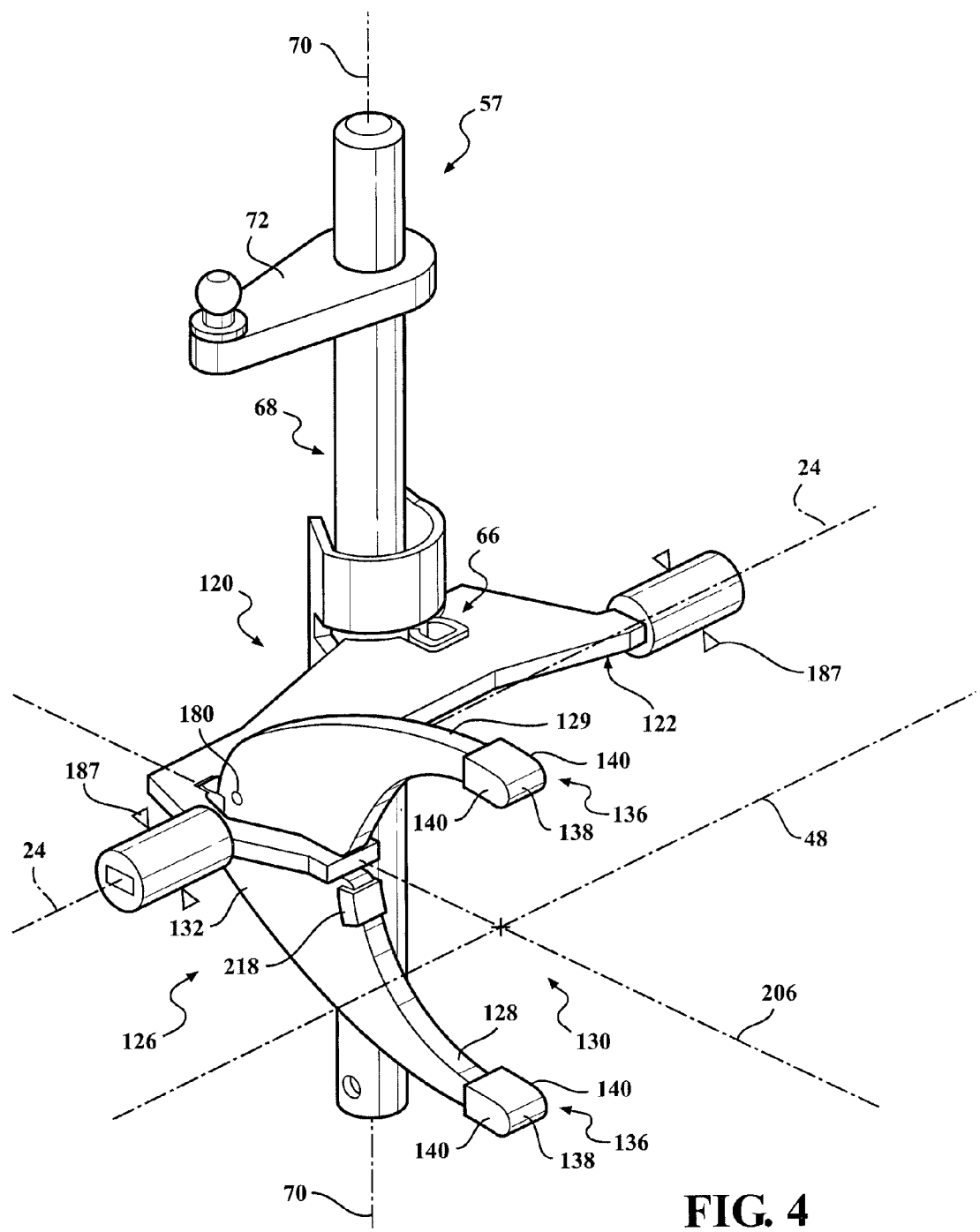
FIG. 4 is a perspective view of the shift fork assembly and prior gear shifter shaft assembly of FIG. 3.

Referring to FIGS. 3 and 4, first embodiment shift fork assembly 120 includes shift rail member 122, and shift fork member 126 carried by the shift rail member. Shift fork member 126 has two fork-fingers 128, 129, which are analogous to fingers 28, 29. First and second fingers 128, 129 define U-shaped opening 130 and are joined at fork hub section 132. Fork member 126 is generally flat, having opposed, substantially parallel and substantially planar first and second surfaces 133, 134. Distal ends 136 of fingers 128, 129 terminate in control ring engaging tips 138, which may be molded of a resilient material such as, for example, PA6 (Nylon), and define opposed, parallel abutting surfaces 140. With fork assembly 120 installed in a gearbox, tips 138 are disposed in groove 42 of control ring 44 of the gear change mechanism 56, and each surface 140 interfaces the opposing axial sides 46 defining groove 42.

Figure 5:
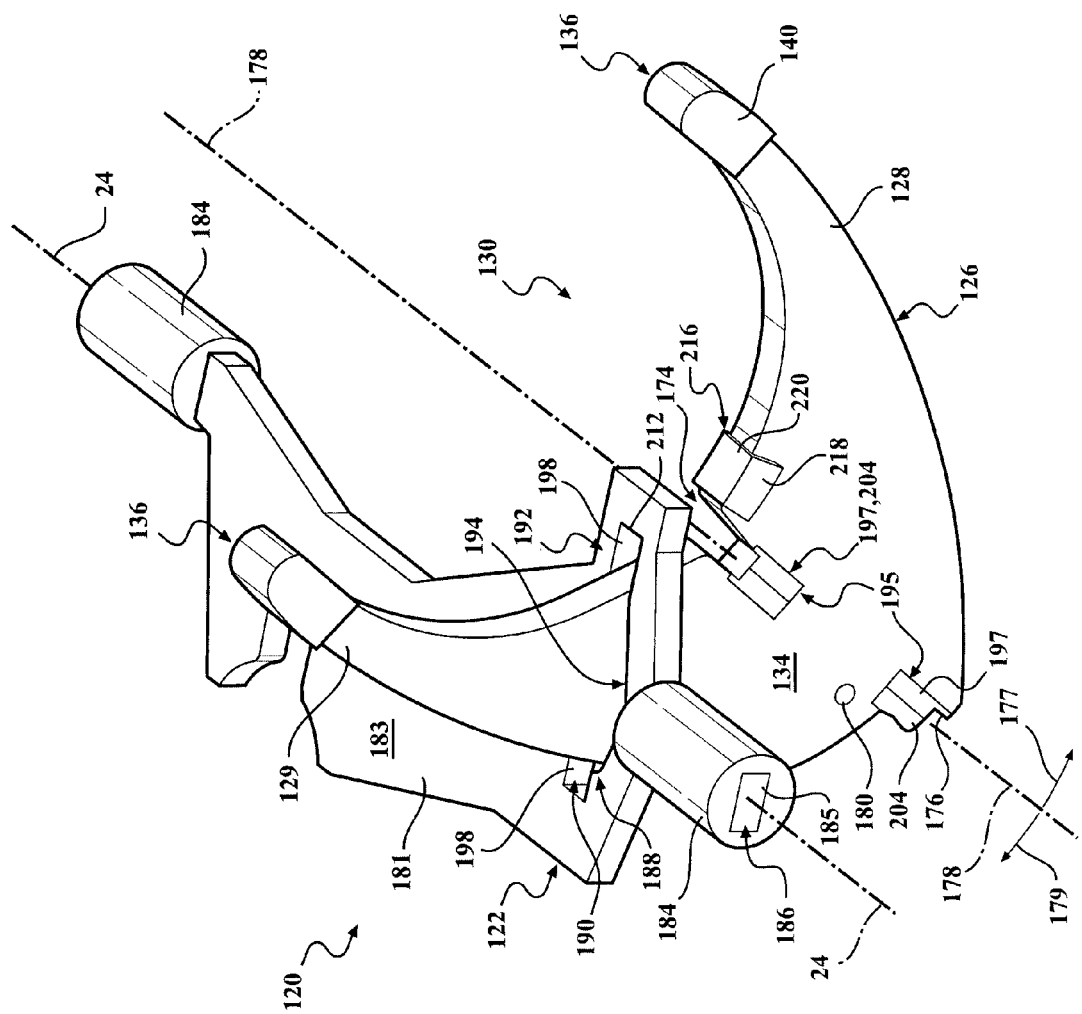
FIG. 5 is a perspective view of the shift fork assembly of FIG. 3 in a first partially assembled state.

Referring to FIG. 5, the shift fork member 126 further includes a fork slot or receiving portion 174 in hub section 132 at the bottom of the substantially U-shaped opening 130, an abutment shoulder 176 formed in the outer circumference of hub section 132 and located on a first side 177 of imaginary central line 178 of the shift fork member 126. An aperture 180 through the hub section 132 is located on the second side 179 of central line 178. The first and second sides 177, 179 of central line 178 lie in a plane defined by either of opposed and parallel fork member planar surfaces 133, 134. The sum of the distances from central line 178 to the closest edge of aperture 180 and to shoulder 176, is slightly larger than the thickness $T_r$ of the planar body 181 of shift rail member 122 between its opposed, substantially parallel and substantially planar lateral surfaces 182 and 183. The sum of the distances from fork member central line 178, of each of the interfacing sides of open-ended fork slot 174, which are respectively located on the first side 177 and second 179 side of central line 178, is similarly larger than thickness $T_r$ of shift rail member body 181. It is to be understood that shift rail member body 181 need not entirely lie in a plane, but rather, it may be formed to provide different heights, or angles, between portions of its opposed lateral side surfaces 182 and/or 183. Similarly, it is to be understood that shift fork member 126 need not entirely lie in a plane, but rather, it may be formed to provide different heights, or angles, between portions of its opposed lateral side surfaces 133 and/or 134.

Figure 15:
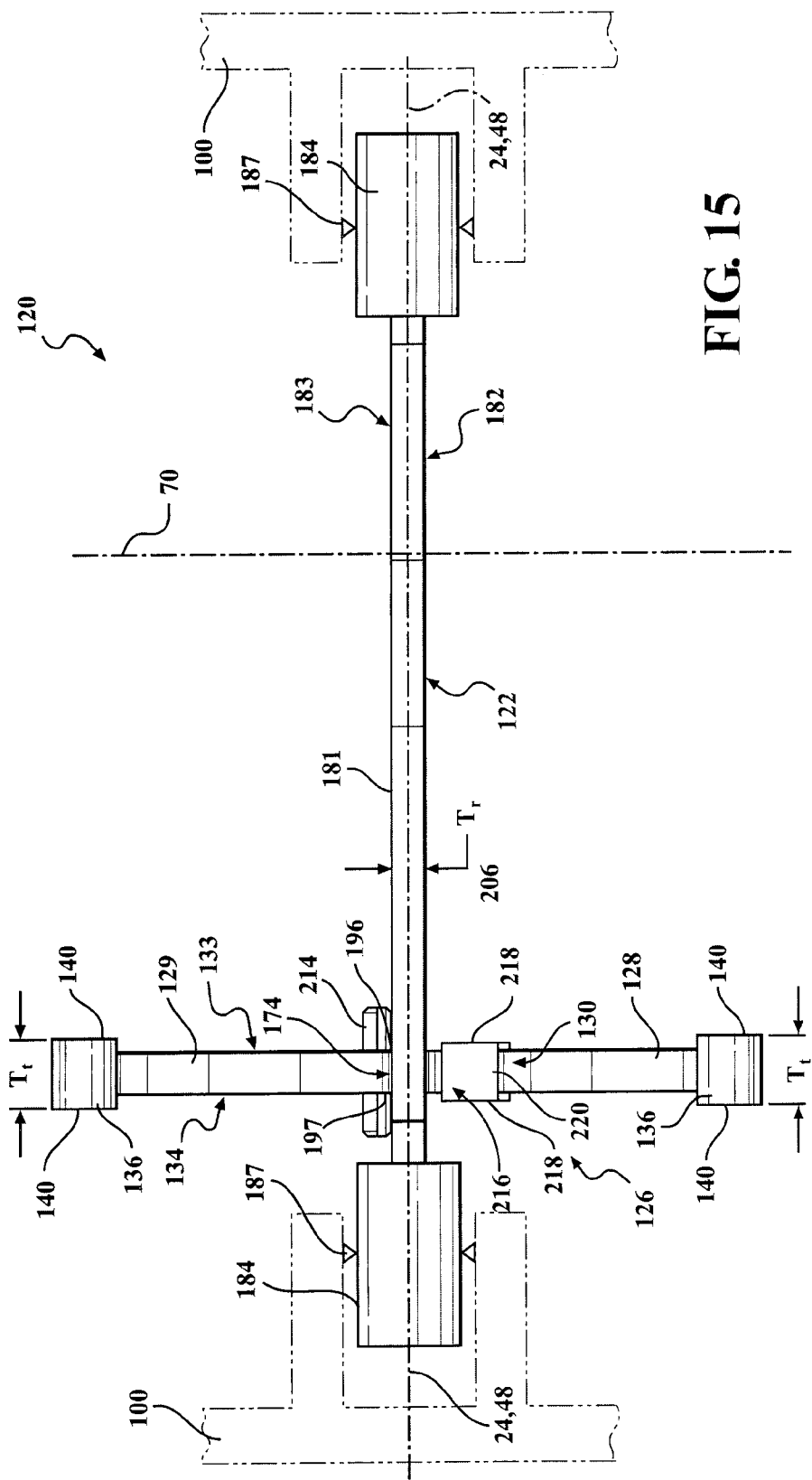
FIG. 15 is a side view of the shift fork assembly of FIG. 10 along an axis that, when the shift fork assembly is installed in the transmission or gearbox partially shown in phantom lines, would intersect the central axis of the gear shift control ring of the gear change mechanism shown in FIG. 3.
Figure 16:
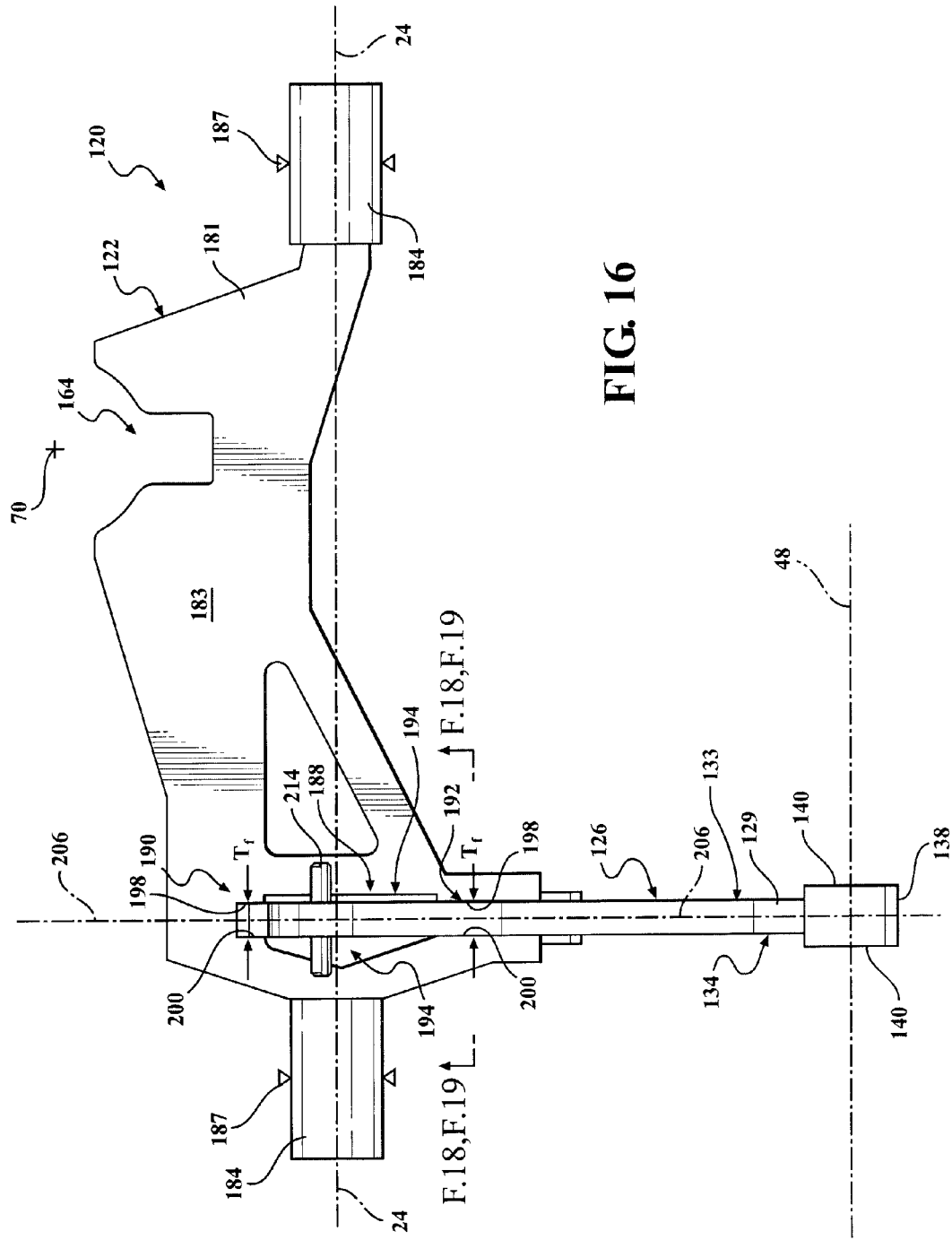
FIG. 16 is a plan view of the shift fork assembly of FIG. 15.
Figure 17:
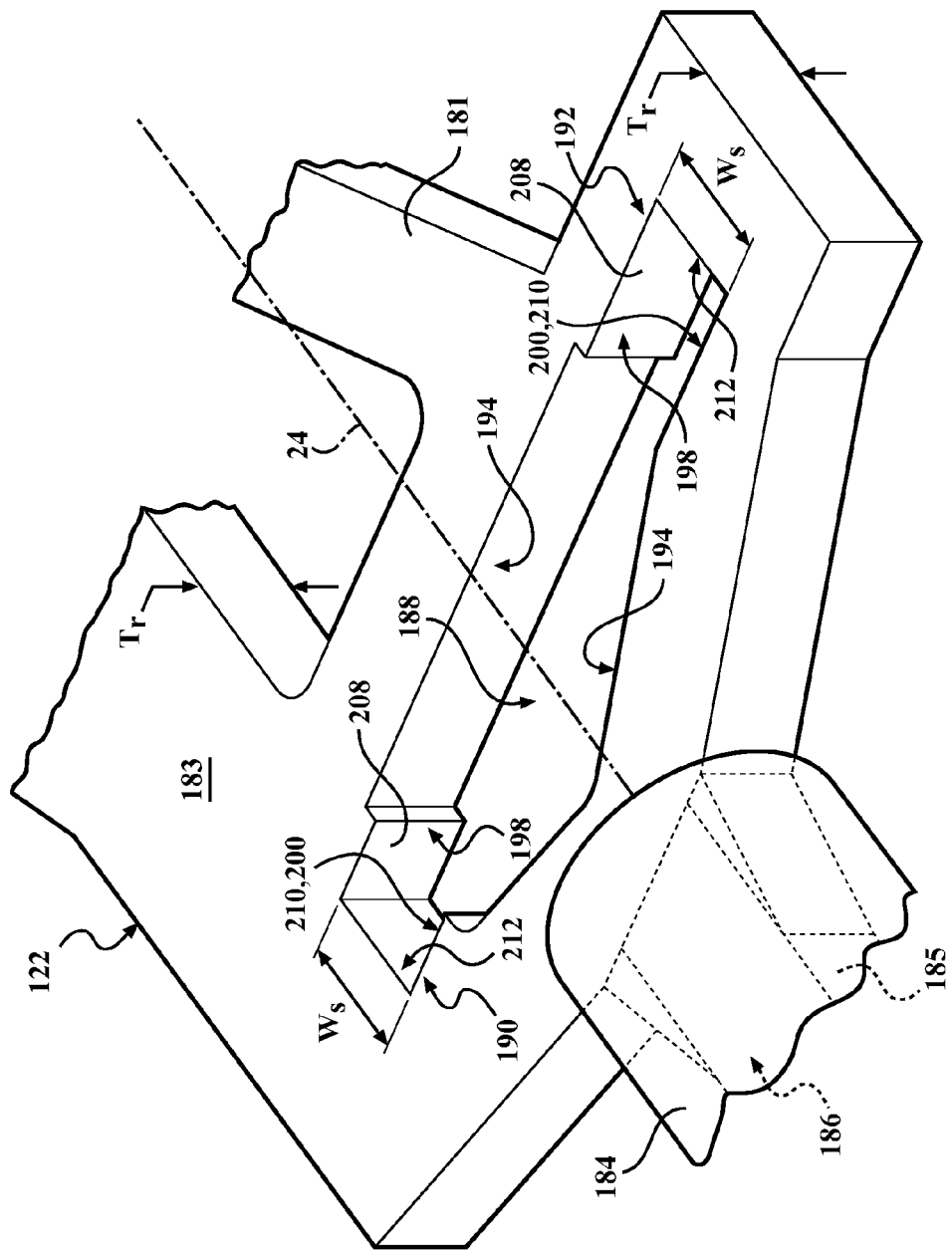
FIG. 17 is an enlarged, fragmented, perspective view of the shift rail member of the first embodiment shift fork assembly shown in FIG. 3.

Shift rail member body 181 extends between and is fixed to a pair of opposed shift rail member cylindrical portions 184 that are coaxial relative to axis 24 and moveable therealong with shift rail member body 181. Shift rail member cylindrical portions 184 each include a rectangular opening 186 extending therethrough along axis 24, into which a cooperating portion 185 of shift rail member body 181 is received. Cylindrical portions 184 are radially supported on bushings 187 (shown schematically in the Figures) mounted in the housing of a gearbox 100 (FIG. 15). Bushings 187 allow shift rail member 122 to move axially along axis 24 and would permit rotation about axis 24. Shift rail member 122 is supported against substantial rotation about axis 24 through its abutting interengagement with fork member 126, which is supported against substantial rotation generally about axis 24 or axis 48 through its sliding interengagement with control ring groove 42, which encircles gear shaft 49.

Thus, shift fork assembly 120 is mounted in gearbox 100 such that its shift rail member 122 is slidable along axis 24 but is substantially non-rotatable thereabout. Axial movement of shift rail member 122 along axis 24 is actuated by shift finger 66, which moves with shift rod 68 as described above, and is disposed within open-ended slot 164 formed in shift rail member body 181. Slot 164 is dimensioned and positioned in a manner similar to slot 64 of prior shift fork assembly 20. It is to be understood that herein, the shift rail or fork members are respectively shown in a particular configuration, but may vary in configuration from gate-to-gate in gear box 100. For example, the location along axis 24 of slot 164 in which shift finger 66 is received, may vary between different gates. Similarly, the orientation of a fork member's fingers 128, 129, through which a fork member 126 is operatively engaged with its respective control ring 44, may vary relative to its respective central line 178 and/or hub 132 from gate-to-gate in gearbox 100.

The shift rail member body 181 is provided with a slot or void 188 traversing thickness $T_r$ and in which shift fork member 126 is mounted. Slot 188 is elongate, and its length extends in directions transverse to the directions along axis 24 in which shift rail member 122 axially slides. Relative to axis 24, slot 188 is defined by opposing first and second axial support recesses 190, 192 located at opposite ends of the length of slot 188 and further cut-out portions 194 located between recesses 190, 192. Each of recesses 190, 192 is defined by an interfacing pair of first and second wall segments 198, 200 that extend along the length of slot 188.

Relative to axis 24, first and second axial abutment faces 196, 197 of shift fork member 126 are respectively located on sides 133, 134 of fork member hub section 132 and are disposed in shift rail member slot axial support recesses 190, 192, and may be established on bosses 195 projecting from the opposite planar sides 133, 134 of fork member hub section 132.

In the first embodiment shift fork assembly 120, first and second fork member axial abutment faces 196, 197, which are disposed in shift rail member slot recesses 190, 192, respectively define parallel, planar surfaces 202, 204 that respectively interface with shift rail member slot wall segments 198, 200 that define recesses 190, 192. As noted above, axial abutment faces 196, 197 may be formed on bosses 195 provided on fork member sides 133, 134, and provide dimensionally-toleranced features that extend over relatively small areas defined by the bosses, thereby facilitating better control over establishing the proper fork member thickness $T_f$ between abutment faces 196 and 197, which are disposed in shift rail member slot axial support recesses 190, 192. In first embodiment shift fork assembly 120, the width $W_s$ of slot 188 in each of the axial support recesses 190, 192 between planar surfaces 208, 210 of wall segments 198, 200 is slightly larger than the thickness $T_f$ of shift fork member hub between planar abutment faces 196, 197. Between shift rail member 122 and shift fork member 126, in recesses 190, 192, the small clearance between $T_f$ and $W_s$ permits a limited amount of movement about axis 206 and, relative to axis 24, of pivot axis 206 itself. The degrees of freedom afforded fork member 126 by this clearance accommodate wobbling movement of control ring 44 during its movement between neutral and gear-engaging positions.

In first embodiment shift fork assembly 120, shift rail member wall segments 198, 200 respectively define parallel planar surfaces 208, 210 that are normal to axis 24. The widths $W_s$ of slot 188 at its further cut-out portions 194, which may vary along the length of slot 188 between recesses 190, 192, are substantially larger than the greatest value of fork member thickness $T_f$ between axial faces 196 and 197, and perhaps even the thickness $T_t$ of the fork member's control ring engaging tips 138 between their opposed abutting surfaces 140. It is to be understood that alternatively, one or both of the control ring engaging tips 138 may be installed onto its distal end 136 subsequent to insertion of fork member 126 into slot 188, and thus slot width $W_s$ in further cut-out portion 194 may be less than tip thickness $T_t$.

There are two primary advantages achieved by using such further cut-out portions 194, in which surfaces of slot 188 are maintained out of contact with fork member 126: First, they reduce the size of the areas of the shift rail member slot 188 that respectively interengage with shift fork hub 132. There are close tolerance requirements on shift rail member slot width $W_s$ and fork member thickness $T_f$ where the rail and fork members interengage within recesses 190, 192. Relative to slot width $W_s$, these closely toleranced shift rail member slot areas, which lie longitudinally of slot 188 outside of further cut-out portions 194, are limited to slot wall segments 198, 200 that respectively interface fork member hub abutment faces 196, 197. Relative to the regions of slot 188 defined by recesses 190, 192 that have a first width $W_s$, the second widths $W_s$ in regions of slot 188 defined by the further cut out portions 194 need not be held to closely controlled tolerances, and thus manufacturing of the shift rail member is simplified.

Secondly, the further cut out portions 194 allow portions of the shift fork member to be larger than what otherwise could be passed through the shift rail member slot 188 were it in its simplest form, i.e., were slot 188 merely an elongate slot with continuously parallel opposed longitudinal walls corresponding to slot support recesses 190, 192. Thus, assembly of the fork member to the shift rail member is simplified.

Figure 6:
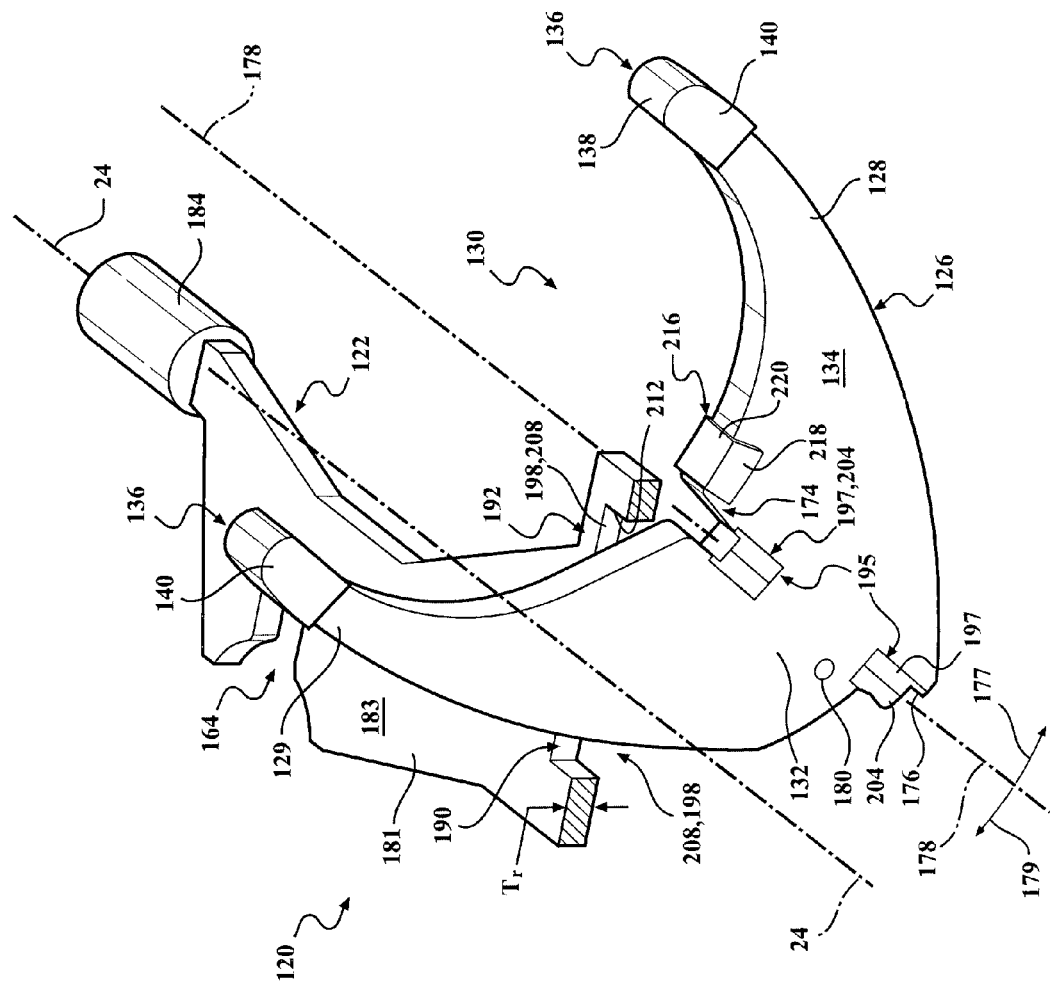
FIG. 6 is a sectioned perspective view of the shift fork assembly of FIG. 5 in its first partially assembled state.
Figure 7:
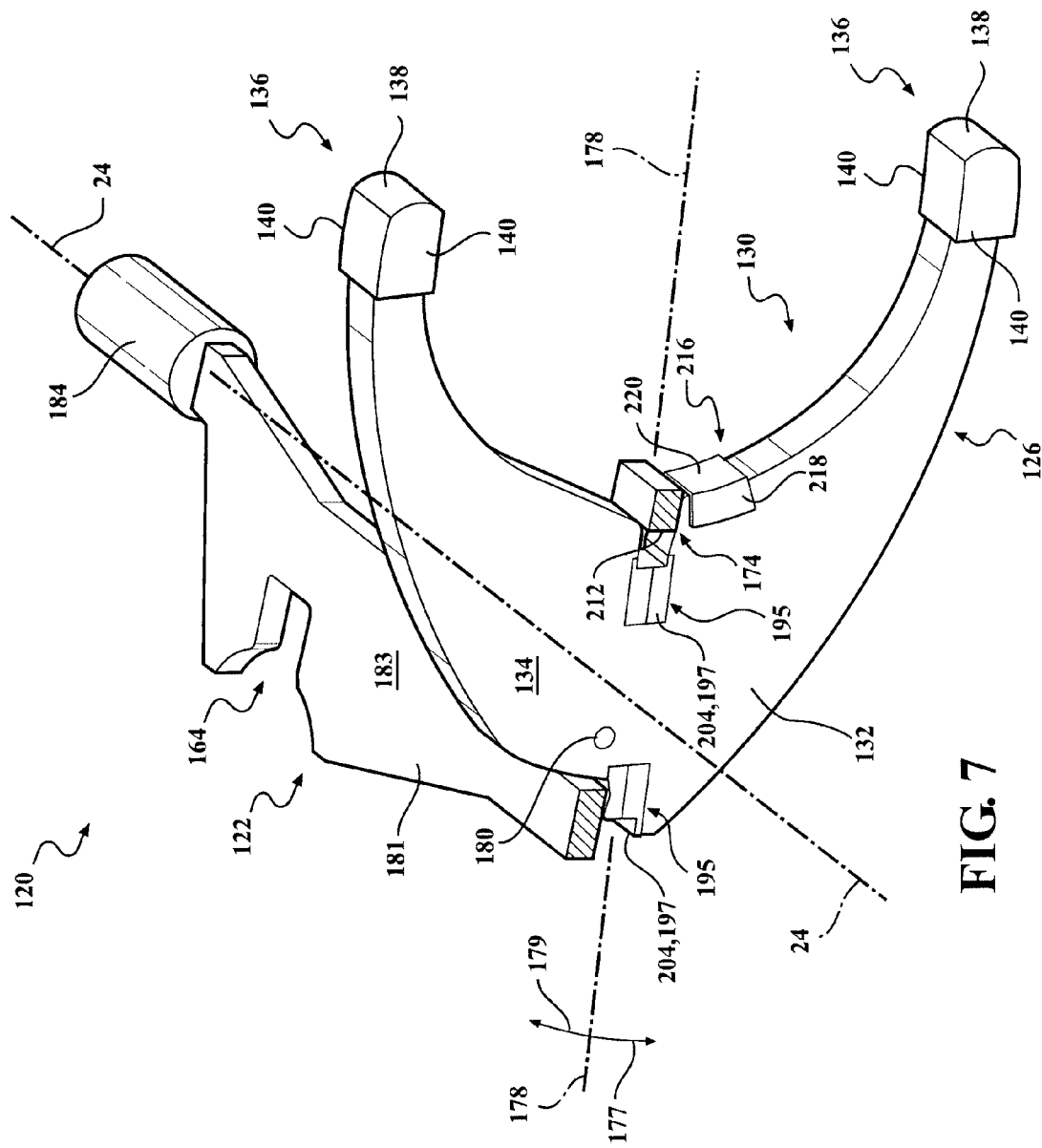
FIG. 7 is a sectioned perspective view of the shift fork assembly of FIG. 5 in its second partially assembled state.
Figure 8:
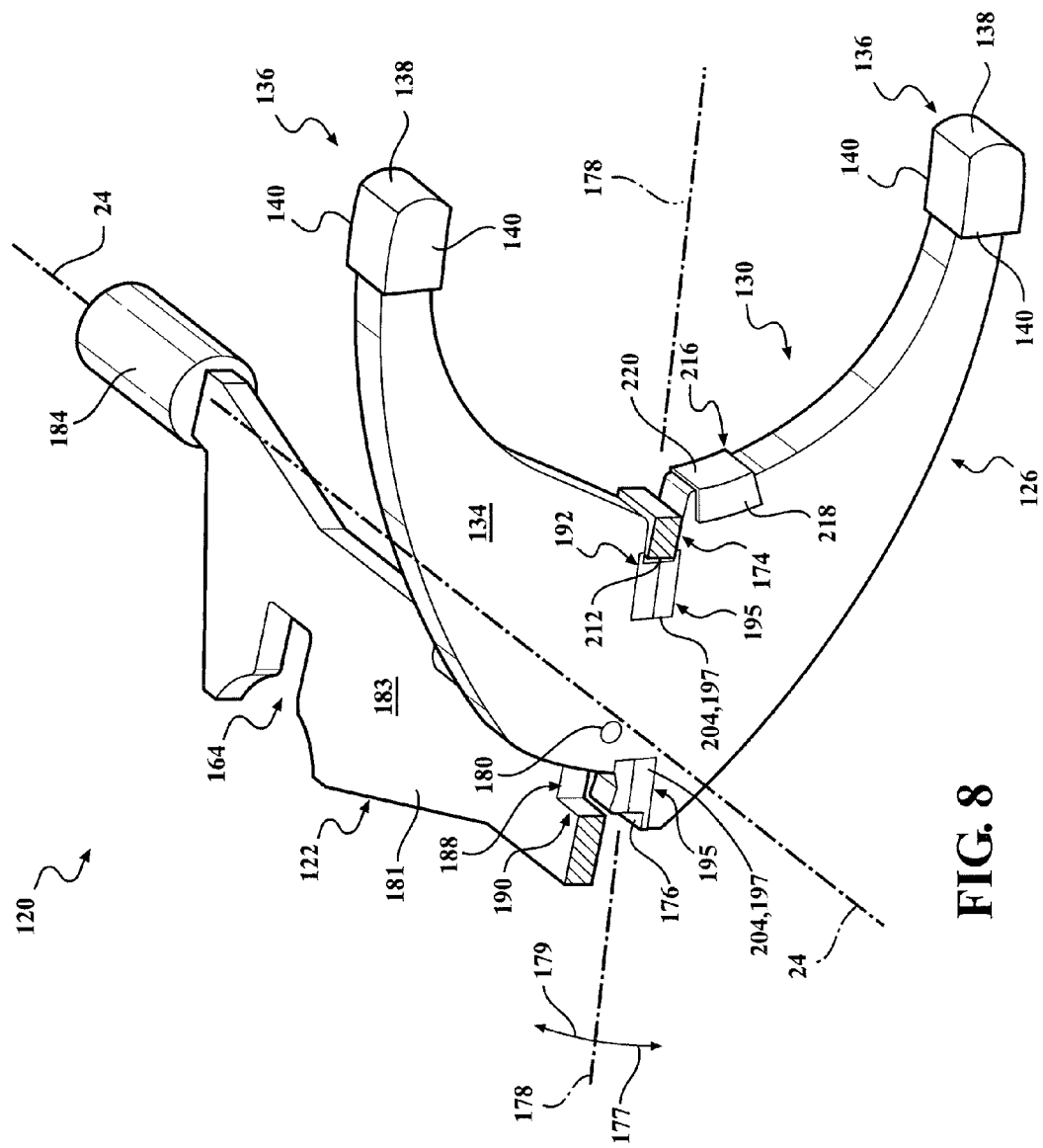
FIG. 8 is a sectioned perspective view of the shift fork assembly of FIG. 5 in its third partially assembled state.
Figure 9:
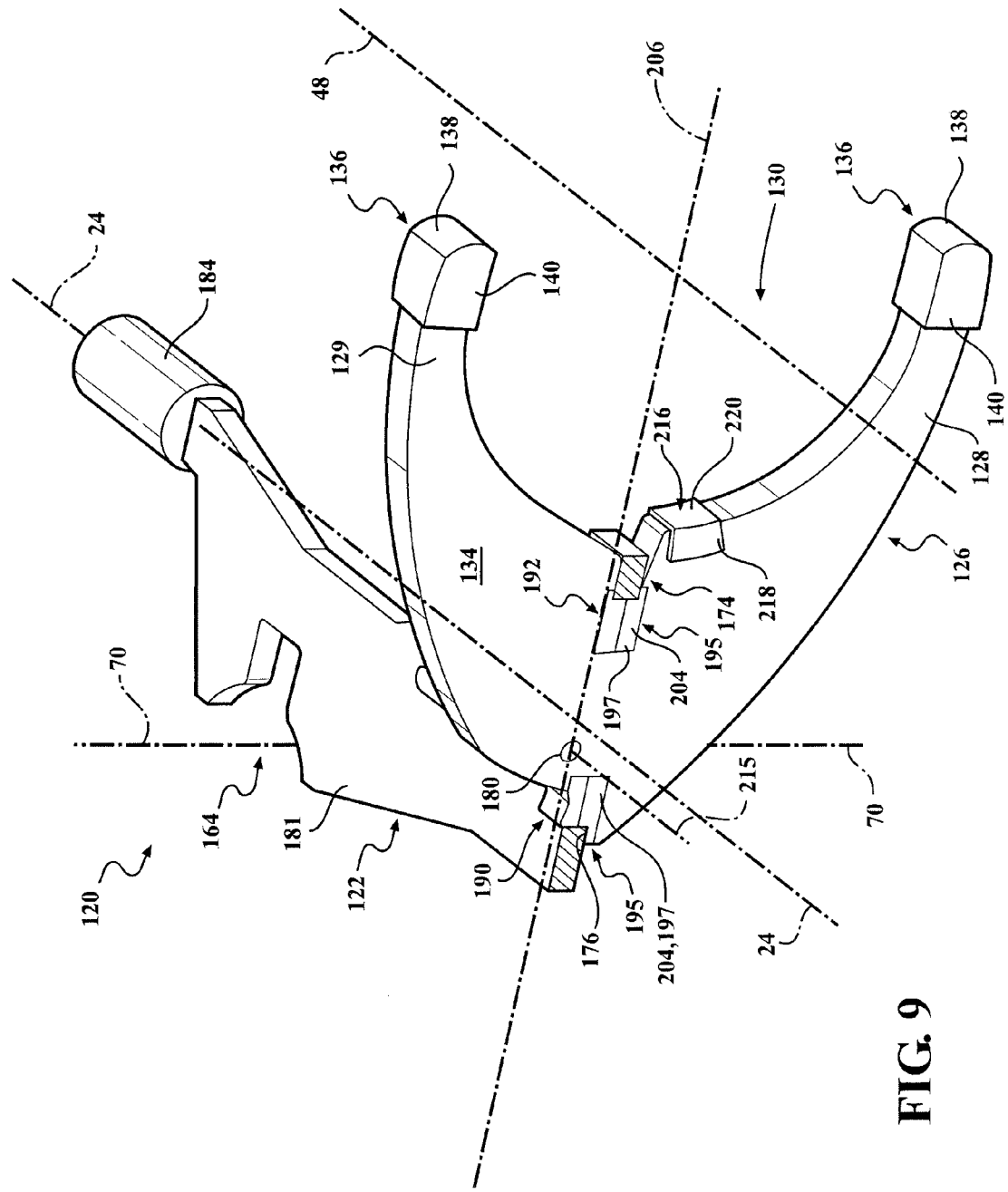
FIG. 9 is a sectioned perspective view of the shift fork assembly of FIG. 5 in its fourth partially assembled state.
Figure 10:
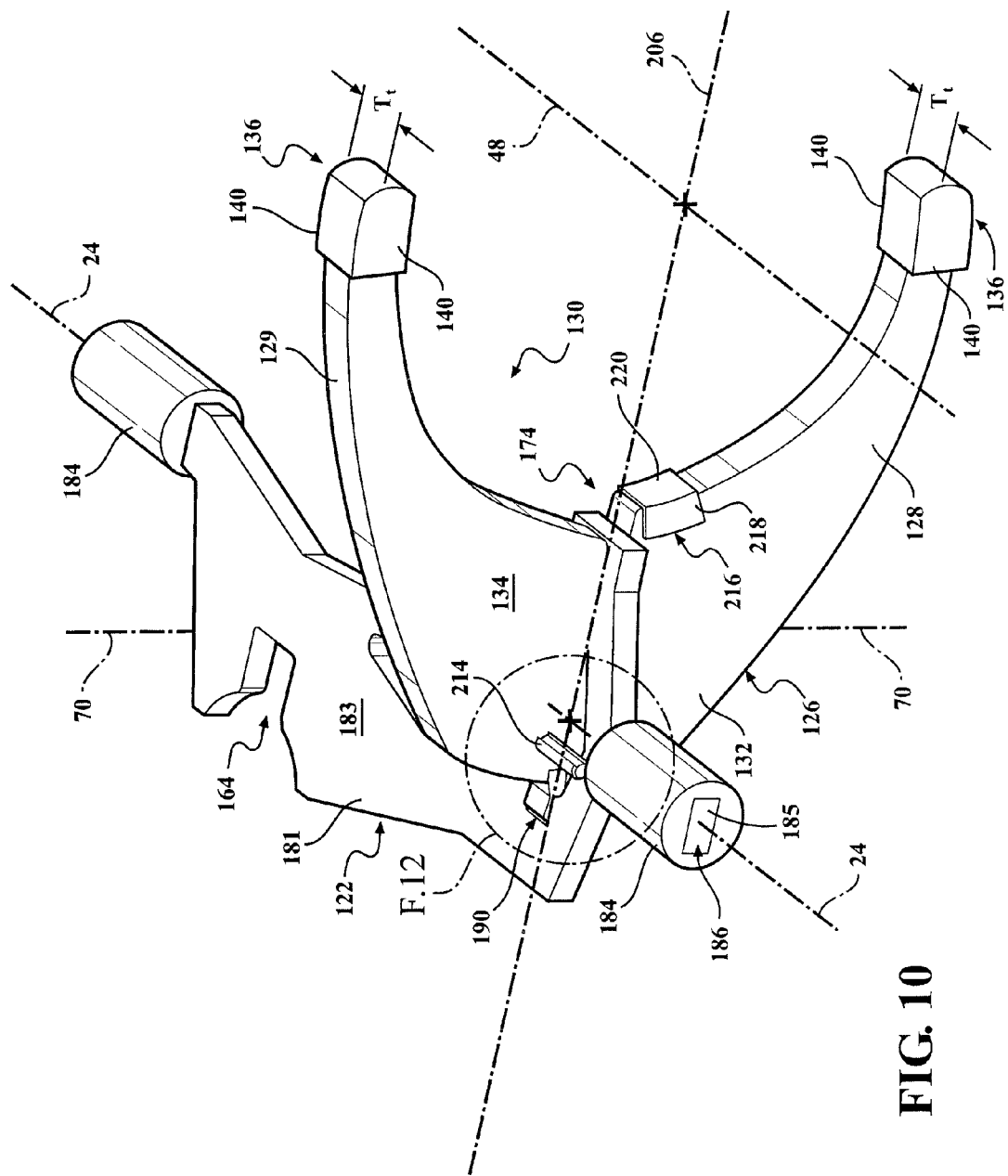
FIG. 10 is a perspective view of the shift fork assembly of FIG. 9 in its fully assembled state.

In assembling shift rail member 122 and fork member 126 to construct first embodiment shift fork assembly 120, an assembler inserts the second shift finger 129 which lies on the second side 179 of shift fork member central line 178 (and which may or may not include a tip 138 at its distal end 136), into slot 188 from the direction of first shift rail member body lateral side 182, as shown in FIGS. 5 and 6. This insertion continues until slot or receiving portion 174 of the fork member receives the short edge or received portion 212 of shift rail member elongate slot 188 defining the end of second axial support recess 192, as shown in FIG. 7. The assembler then rotates the shift fork member 126 in slot 188 while moving the received short edge 212 (the short edge 212 is shown in the Figures as a face 212 of the slot 188) further into receiving fork member slot 174, until shoulder 176 formed on the first side 177 of shift fork member central line 178 abuts the first lateral surface 182 of shift rail member body 181, as shown in FIGS. 8 and 9. The assembler then positions elongate stop member 214, which may be a rivet or an elongate spring pin, into fork member hub aperture 180 as shown in FIGS. 10 and 12. At least one end of stop member 214 projects beyond a fork member planar surface 133, 134 and superposes shift rail member body second lateral surface 183. Stop member 214 may be secured to fork member 126 by being plastically deformed (as in the case of a rivet), or elastically deformed by an interference fit to aperture 180, to prevent its withdrawal from the aperture. Once positioned, the stop member is at all times engaged with the fork member.

Referring to FIGS. 11-14, the stop member 214, shown here as an elongate cylindrical spring pin (FIG. 11) is circumferentially compressed and interference-fitted into aperture 180. In this embodiment, both ends of stop member 214 project from fork member sides 133, 134 and superpose second shift rail member body lateral surface 183, with stop member 214 extending over further cut-out portion 194 of slot 188. Once the shift fork assembly is fully assembled, the central axis 215 of fork member cylindrical aperture 180 is generally parallel with shift rail member axis 24 and may be in or, as shown, close to an imaginary plane 217 that is substantially perpendicular to shift rail member body lateral surface 183 and that contains axis 24, as best shown in FIG. 13.

The inserted shift fork member 126 is thus retained in shift rail member slot 188 by the portion of shift rail member body 181 adjacent slot short edge 212 being captured between the opposing sides of fork member slot 174, and by portions of shift rail member body 181 near first axial support recess 190 being captured between fork member shoulder 176 and the stop member 214 fitted into aperture 180. Thus, a portion of shift rail member body 181 is captured and is moveable between stop member 214 and shoulder 176, which each superpose a respective one of the shift rail member body's opposite sides 182, 183; contact therebetween partially limits the relative motion between the shift rail member and shift fork member to being in a range defined between the stop member 214 and the shoulder 176.

A small but appreciable clearance defined by the difference between $W_s$ and $T_f$ within shift rail member slot axial support recesses 190, 192 which is constant throughout shift rail member body thickness $T_r$, in first embodiment shift fork assembly 120, and exists at least near the slot opening in each of the opposed shift rail member body surfaces 182, 183 in the other embodiments herein disclosed, allows pivotal relative movement between the shift fork member and the shift rail member about pivot axis 206, which is discussed further below. The sides of the shift rail member slot support recesses 190, 192 support the shift fork member as it pivots about axis 206, which pivoting may occur as control ring 44 is moved between its neutral and gear-engaging positions.

Mounted as such, the shift fork member is able to pivot relative to the shift rail member about pivot axis 206, the range of pivoting motion defined by locations of supporting contact sites between the shift rail member and the fork member. Relative to the shift fork assembly, the orientation of pivot axis 206 itself may move slightly with changes in locations of supporting contact between the shift rail member and the fork member, with relative sliding movement between the shift rail member and fork member imparting reorientation of the pivot axis 206 relative to the shift rail member.

Locations of supporting contact will be altered as the fork member is repositioned relative to the shift rail member in accommodating wobbling movement of control ring 44. In shift fork assembly 120, the respective sites of abutting contact between the shift rail and fork members include: (a) between shift fork member hub abutment faces 196, 197, and the first and second wall segments 198, 200 of shift rail member slot recesses 190, 192; and (b) between the opposite planar sides 182, 183 of shift rail member body 181, and shift fork member shoulder 176 and stop member 214, and the opposing sides of fork member slot 174. The sites of abutting contact between a shift fork hub abutment face 196, 197 and a shift rail member slot recess wall segment 198, 200 respectively define an interengaging pair of surfaces 202, 204 and 208, 210 that mutually interface in directions substantially parallel with shift rail axis 24. Notably, at these sites there is direct abutting contact between the shift rail member and the shift fork member; no intermediary element is necessary therebetween through which forces are transferred when inducing control ring movement.

The sites of abutting contact between the respective shift rail member body opposite planar side 182, 183, and shift fork member shoulder 176 or stop member 214, and the opposing side of fork member slot 174, define end stops limiting the range of relative motion between shift rail member 122 and fork member 126. The end stops defined by the shoulder 176 and stop member 214 preferably lie outside the normal range of relative motion between rail member 122 and member 126, and establish extreme locations of supporting contact therebetween, and thus normally would not be encountered during operation of shift fork assembly 120.

Thus, the shift fork member 126 is able to pivot about an adjustable pivot axis 206 that extends substantially perpendicularly between axis 24 and/or axis 48. In the neutral position 52, pivot axis 206 may intersect one or both of the gear axis 48 about which control ring 44 is centered, and the longitudinal axis 24 of the shift rail member 122. The degrees of freedom afforded fork member 126 relative to shift rail member 122 by facilitating its ability to pivot about axis 206, and by facilitating reorientation of adjustable pivot axis 206 itself relative to axis 24 and/or axis 48, allow the shift fork assembly 120 to accommodate the wobbling movement of the shift control ring 44, should such wobbling movement occur. Accordingly, shift fork assembly 120 reduces the wear of the connection between the shift control ring 44 and shift fork member 126, and also isolates the vibration caused by such wobbling movement that may be transmitted to the shift fork member 126 without its further transference from the fork member 126 to the shift rail member 122 and through shifter shaft assembly 57 to the operator/driver. Notably, while axis 206 and fork member central line 178 are generally parallel, and may in some circumstances be coincident, they are not necessarily so.

Fork member 126 may include overload pad 216 that projects from each of the opposed planar sides 133, 134 of hub section 132, and from the inner circumferential edge of fork member hub section 132 that defines part of U-shaped opening 130. Pad 216 may be formed of the same material as control ring engagement tips 138, and is disposed within groove 42 of control ring 44. Pad 216 has opposed planar side surfaces 218 that are distanced from each other by pad thickness $T_p$ which may be substantially equivalent to thickness $T_t$ of control ring engaging tips 138, and that are substantially parallel to fork member hub planar side surfaces 133, 134. Normally, each of the opposed planar side surfaces 218 of pad 216 has clearance to its respectively interfacing control ring groove axial side surface 46 in the range of 0.5 to 1.5 mm. The surface 220 of pad 216 that extends between pad side surfaces 218, and that interfaces control ring groove floor 47, may be provided with a similar clearance from the groove floor. Pad 216 provides overload protection for shift fork assembly 120 by one of its surfaces 218 being brought into contact with its interfacing axial side 46 of groove 42 under abnormally high load conditions between fork member 126 and control ring 44 that may arise during movement between neutral and gear-engaging positions. These abnormally high loads, which would otherwise be borne by the distal ends 136 of fork fingers 128, 129, and which might lead to fingers 128, 129 being bent or control ring engaging tips 138 being ground away by groove sides 46, are instead carried by fork member hub section 132 through pad 216.

Figure 18:
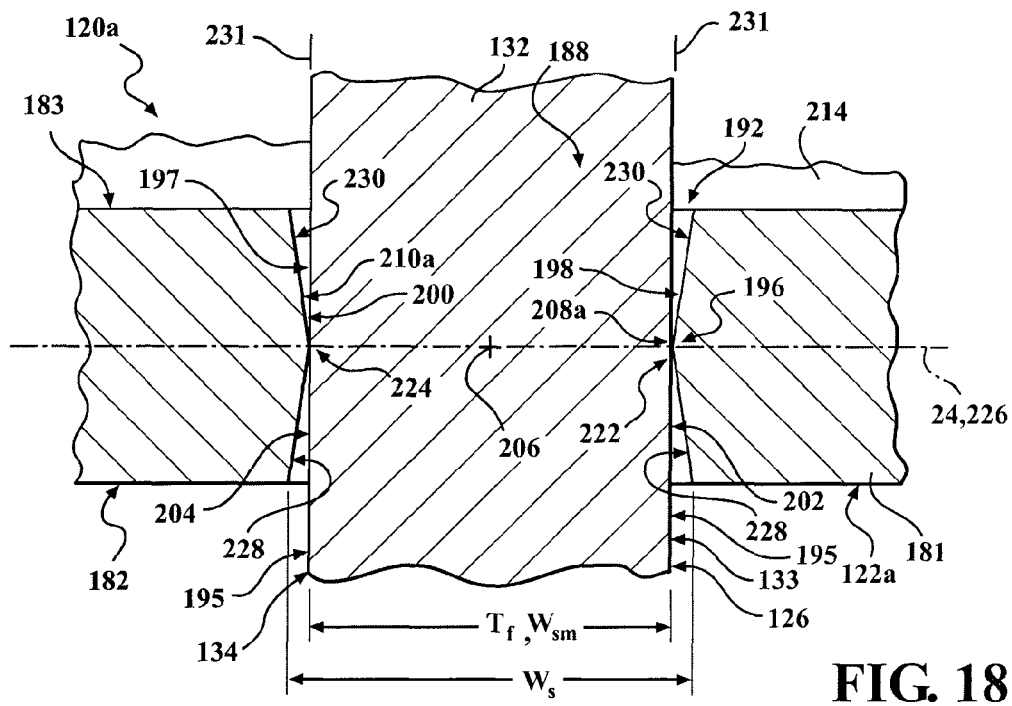
FIG. 18 is an enlarged, fragmented view of a cross-section of the shift fork assembly of FIG. 16 taken along line F.18-F.18, but showing a second embodiment shift fork assembly.

Second embodiment shift fork assembly 120a is substantially identical in its structure, function and assembly method, to those of first embodiment shift fork assembly 120 except as described below. In shift fork assembly 120a, elements that are significantly modified relative to their counterparts in the first embodiment are appended with the suffix "a". Referring to FIG. 18, shift fork assembly 120a includes second embodiment shift rail member 122a and first embodiment fork member 126. Relative to shift rail member 122a, the respective surfaces 208a, 210a of wall segments 198, 200 that define slot 188 in first and second axial support recesses 190, 192, as viewed in a cross-section taken in a plane parallel to axis 24 and perpendicular to planar lateral surfaces 182, 183, are substantially convex or peaked at an obtuse angle as shown, rather than being planar as in first embodiment shift rail member 122. In other words, in second embodiment shift rail member 122a the distance between interfacing surfaces 208a and 210a of first and second wall segments 198, 200, at their respective midpoints 222, 224 between shift rail body planar lateral surfaces 182, 183, defines a minimal value $W_{sm}$ of slot width $W_s$ within axial support recesses 190, 192. Midpoints 222 and 224 may lie in a plane 226 that is equidistant from and parallel to shift rail member body planar surfaces 182, 183 and contains axis 24. Under certain conditions, plane 226 may also contain adjustable pivot axis 206, as shown. In shift fork assembly 120a, first outward portions 228 of slot wall segments 198, 200 are defined on surfaces 208a and 210a between their respective midpoints 222, 224 and planar shift rail member body first lateral surface 182; second outward portions 230 of slot wall segments 198, 200 are defined on surfaces 208a and 210a between their respective midpoints 222, 224 and planar shift rail member body second lateral surface 183.

In shift fork assembly 120a, opposed wall segments 198, 200 of each recess 190, 192 are substantially mirror images of each other and are separated by width $W_s$ which may vary across the shift rail member body thickness between planar surfaces 182, 183, with distance from plane 226. In fork assembly 120a, surfaces 208a, 210a are closest together (i.e., $W_s$ is smallest or at minimal value $W_{sm}$) in plane 226 (i.e., between surface midpoints 222, 224), and diverge (i.e., $W_s$ grows in magnitude) with increasing distance from plane 226 towards either planar shift rail member body surface 182 or 183, in directions perpendicular to plane 226. In cross section, as shown in FIG. 18, the surfaces 208a and 210a, which define outward portions 228 and 230 of wall segments 198 and 200 in fork assembly 120a, are each respectively contoured curvilinearly, or linearly at an angle, away from midpoints 222, 224 in directions parallel to axis 24, as these surfaces 208a, 210a retreat from shift rail member plane 226.

When the fork assembly 120a has positioned control ring 44 in its neutral position 52, the respective planar surfaces 202, 204 of first and second axial abutment faces 196, 197 of shift fork member 126 are substantially perpendicular to plane 226, which may contain pivot axis 206, and substantially normal to shift rail member axis 24. Imaginary parallel planes 231 perpendicular to plane 226 and containing midpoints 222, 224 of surfaces 208a, 210a substantially coincide with planar surfaces 202, 204 of shift fork member axial abutment faces 196, 197. Shift fork member 126 is thereby supported by shift rail member 122a such that axis 206 is maintained in a substantially perpendicular orientation relative to axis 24 when the shift fork assembly 120a is in its neutral and gear-engaging positions, thereby reducing the wear caused by sharp corners.

In second embodiment shift fork assembly 120a, shift rail member slot recess minimal width $W_{sm}$ in plane 226 (i.e., between interfacing respective cross-sectional profile midpoints 222, 224 of surfaces 208a, 210a) may be substantially equal to hub thickness $T_f$ between planar surfaces 202 and 204 of shift fork member first and second axial abutment faces 196 and 197. The divergence between interfacing locations on shift rail member slot wall segment surfaces 208a, 210a, as the outward portions 228, 230 of shift rail member slot wall segments 198, 200 respectively retreat from plane 226, facilitates supported relative pivoting motion between shift rail member 122a and fork member 126 about axis 206. Movement of axis 206 itself relative to axis 24 and/or axis 48 is facilitated by the pivoting movement of fork member 126 relative to rail member 122a generally about shift rail slot short edge 212 received by and captured within fork member hub slot 174, as the fork member moves between limits defined by the abutment of fork member shoulder 176 and stop member 214, and shift rail body surfaces 182, 183.

Figure 19:
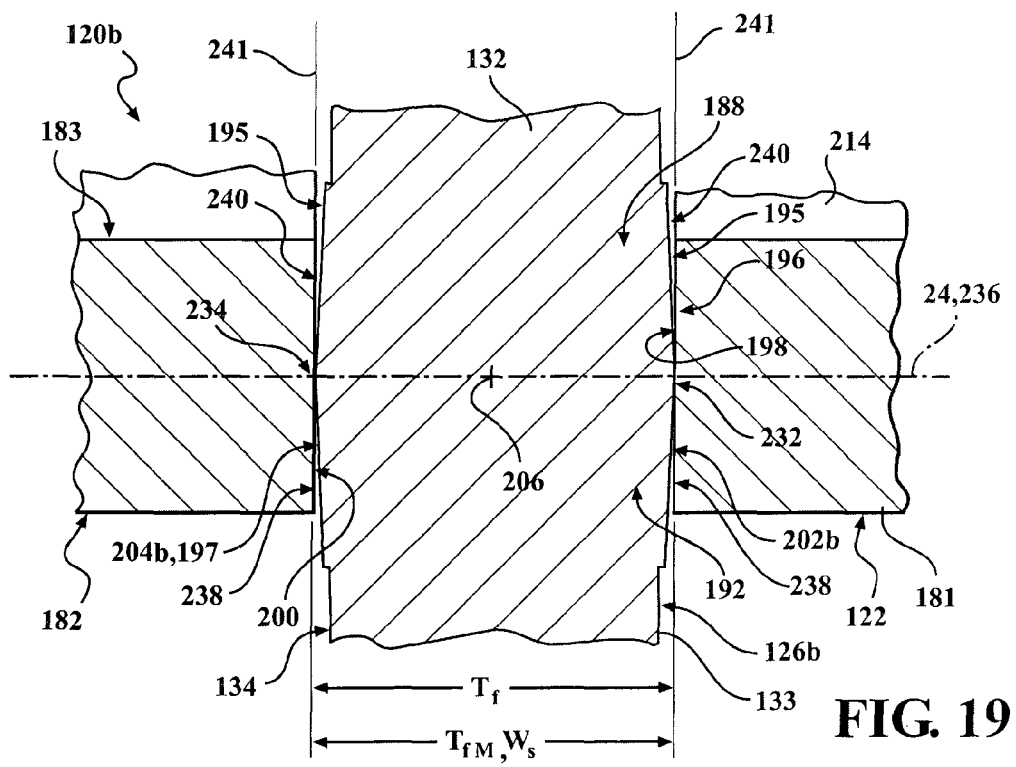
FIG. 19 is an enlarged, fragmented cross-sectional view similar to FIG. 18, taken along line F.19-F.19 of FIG. 16, but showing a third embodiment shift fork assembly.
Figure 20:
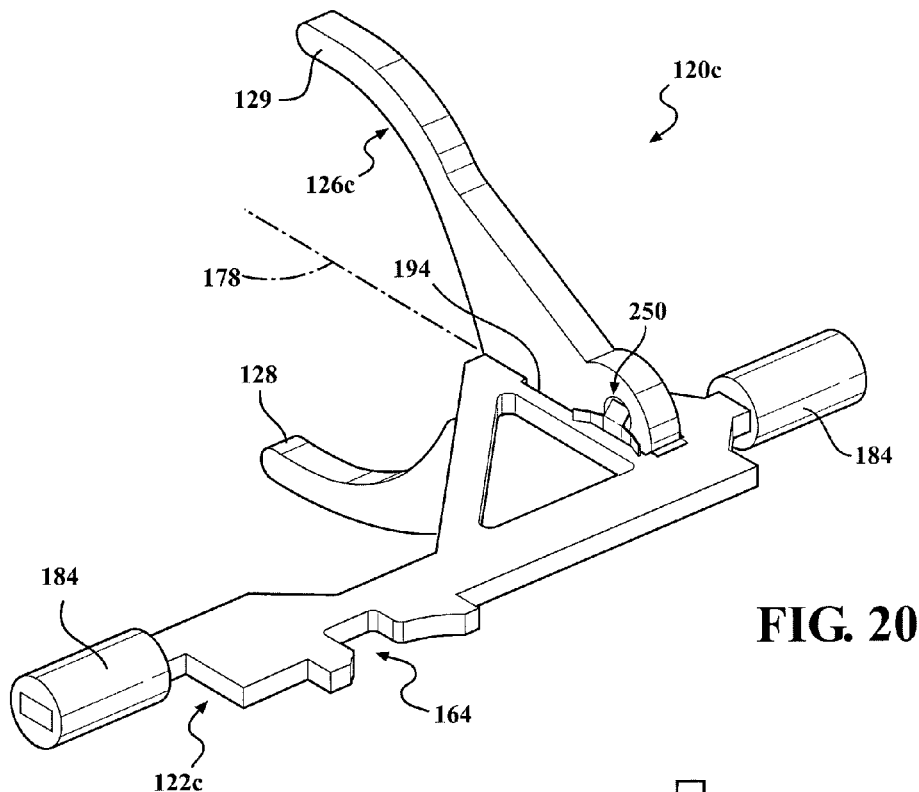
FIG. 20 is a perspective view of a fourth embodiment shift fork assembly.
Figure 22:
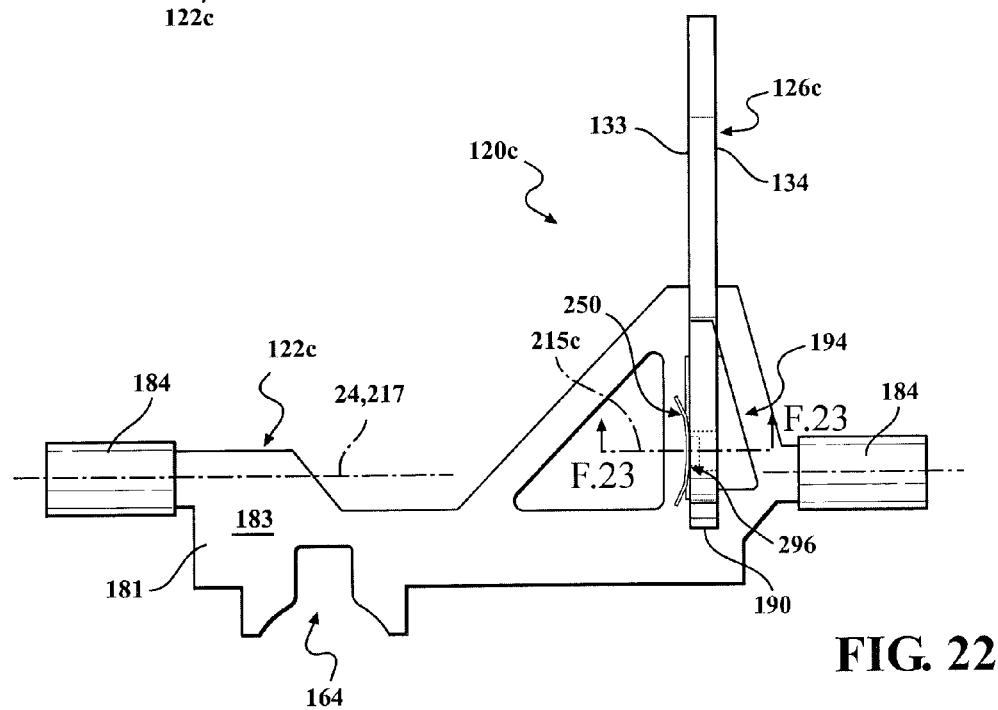
FIG. 22 is a plan view of the shift fork assembly of FIG. 20.
Figure 26:
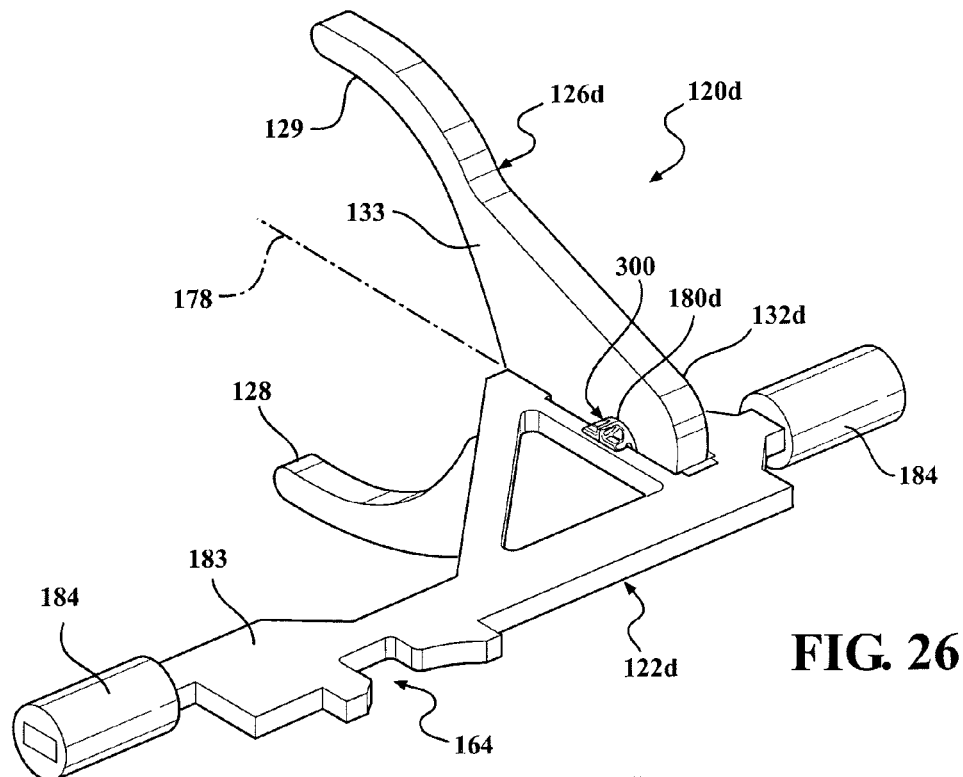
FIG. 26 is a perspective view of a fifth embodiment shift fork assembly.
Figure 27:
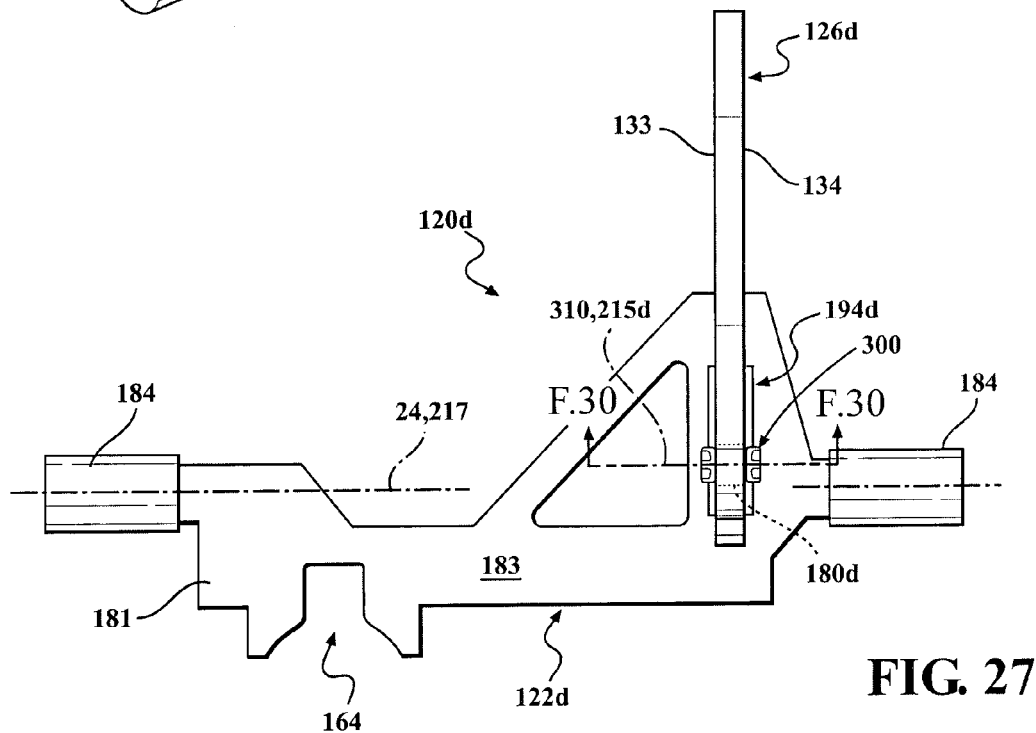
FIG. 27 is a plan view of the shift fork assembly of FIG. 26.

Third embodiment shift fork assembly 120b is substantially identical in its structure, function and assembly method, to those of first embodiment shift fork assembly 120 except as described below. In shift fork assembly 120b, elements that are significantly modified relative to their counterparts in the first embodiment are appended with the suffix "b". Referring to FIG. 19, shift fork assembly 120b includes first embodiment shift rail member 122 and third embodiment fork member 126b. Relative to fork member 126b, the respective surfaces 202b, 204b of first and second axial abutment faces 196, 197 on fork member sides 133, 134, as viewed in a cross-section taken in a plane perpendicular to central line 178 and perpendicular to planar side surfaces 133, 134, are substantially convex as shown or peaked at an obtuse angle, rather than being planar as on first embodiment shift fork member 126. Axial abutment faces 196, 197, which may be established on bosses 195 projecting from planar surfaces 133, 134 (as shown), or instead located in planar surfaces 133, 134 themselves, are stamped or coined such that they have a substantially convex, or peaked profile when viewed in a cross-section taken in an imaginary plane normal to central line 178. In other words, in third embodiment shift fork member 126b, the thickness of hub section 132 between opposed surfaces 202b and 204b of first and second axial abutment faces 196, 197, at their respective midpoints 232, 234 in a direction perpendicular to central line 178, defines a maximal value $T_{fM}$ of fork member thickness $T_f$ on hub 132. Midpoints 232 and 234 may lie in a plane 236 that is perpendicular to fork member surfaces 133, 134, and includes central line 178. Under certain conditions, plane 236 may also contain adjustable pivot axis 206, as shown. In shift fork assembly 120b, first outward portions 238 of axial abutment faces 196, 197 are defined on surfaces 202b and 204b between their respective midpoints 232, 234 and the furthest extent of axial abutment faces 196, 197 on the first side 177 of central line 178, which, relative to plane 236, is at a distance beyond first lateral surface 182 of shift rail body 181 in all cases; second outward portions 240 of axial abutment faces 196, 197 are defined on surfaces 202b and 204b between their respective midpoints 232, 234 and the furthest extent of axial abutment faces 196, 197 on the second side 179 of central line 178, which, relative to plane 236, is at a distance beyond second lateral surface 183 of shift rail body 181 in all cases.

In shift fork assembly 120b, opposed surfaces 202b, 204b of first and second axial abutment faces 196, 197 are substantially mirror images of each other and are separated by thickness $T_f$ which may vary with distance from plane 236 in directions perpendicular to plane 236. In fork assembly 120b, surfaces 202b, 204b are furthest apart (i.e., $T_f$ is largest or at maximal value $T_{fM}$) in plane 236 (i.e., between surface midpoints 232, 234), and converge (i.e., $T_f$ diminishes in magnitude) with increasing distance from plane 236 on either the first or second side 177, 179 of central line 178 in directions perpendicular to plane 236. In cross section, as shown in FIG. 19, the surfaces 202b and 204b, which define outward portions 238 and 240 of axial abutment faces 196 and 197 in fork assembly 120b, are each respectively contoured curvilinearly, or linearly at an angle, away from midpoints 232, 234, as these surfaces 202b, 204b retreat from fork member plane 236.

When the fork assembly 120b has positioned control ring 44 in its neutral position 52, the respective planar surfaces 208, 210 of first and second wall segments 198, 200 of shift rail member 122 are substantially perpendicular to plane 236, which may contain pivot axis 206, and substantially parallel to central line 178 of fork member 126b. Imaginary planes 241 perpendicular to plane 236 and containing midpoints 232, 234 of surfaces 202b, 204b substantially coincide with planar surfaces 208, 210 of shift rail member slot wall segments 198, 200. Shift fork member 126b is thereby supported by shift rail member 122 such that axis 206 is maintained in a substantially perpendicular orientation relative to axis 24 when the shift fork assembly 120b is in its neutral and gear-engaging positions, thereby reducing the wear caused by sharp corners.

In third embodiment shift fork assembly 120b, shift fork member hub maximal thickness $T_{fM}$ in plane 236 (i.e., between opposed respective cross-sectional profile midpoints 232, 234 of surfaces 202b, 204b) may be substantially equal to slot width W$_s$ between planar surfaces 208, 210 of first and second shift rail member slot recess wall segments 198 and 200. The convergence between opposed locations on shift fork member axial abutment face surfaces 202b, 204b, as the outward portions 238, 240 of shift fork member axial abutment faces 196, 197 respectively retreat from plane 236, facilitates supported relative pivoting motion between shift rail member 122 and fork member 126b about axis 206. Movement of axis 206 itself relative to axis 24 and/or axis 48 is facilitated by the pivoting movement of fork member 126b relative to rail member 122 generally about shift rail slot short edge 212 received by and captured within fork member hub slot 174, as the fork member moves between limits defined by the abutment of fork member shoulder 176 and stop member 214, and shift rail member body surfaces 182, 183.

The configurations of second and third embodiment shift fork assemblies 120a and 120b allow their respective shift fork members to more controllably pivot, relative to their respective shift rail members, about axis 206, vis-á-vis the first embodiment fork assembly 120, for there is relatively less clearance along axis 24 between the interfacing surfaces of the shift rail and shift fork members within the shift rail slot recesses. In other words, the clearance between W$_{sm}$ and T$_f$ in shift fork assembly 120a, and between W$_s$ and T$_f$ in shift fork assembly 120b, is less than the clearance between W$_s$ and T$_f$ in shift fork assembly 120.

In embodiments in which surfaces 208a and 210a, or 202b and 204b, are peaked and the outward portions are flat, (see, e.g., FIG. 18), one of ordinary skill in the art will recognize that they are triangular prisms each having an exposed, linear sharp edge extending through midpoints 222, 224, or 232, 234, and lying in plane 226 or 236 as the case may be, the sharp edges parallel and extending longitudinally relative to slot 188. In the second and third embodiment shift fork assemblies having such sharp edges, relative pivoting movement between the shift rail member and shift fork member about axis 206 includes fulcruming motion between an exposed sharp edge defined by the obtusely angled planar surfaces defining outward portions 228 and 230, or 238 and 240, and the abutting planar surface 202, 204, 208, 210. Movement of pivot axis 206 relative to axis 24 and/or axis 48 will, of course, generally involve relative sliding motion between abutting ones of these interfacing surfaces. This relative sliding movement between the shift rail member and fork member imparting reorientation of the pivot axis 206 relative to the shift rail member.

In embodiments in which surfaces 208a and 210a, or 202b and 204b, are curvilinear and the outward portions are rounded (see, e.g., FIG. 19), one of ordinary skill in the art will recognize that they are generally semi-cylindrical, each having a linear, blunt edge extending through midpoints 222, 224, or 232, 234, and lying in plane 226 or 236 as the case may be, the blunt edges parallel and extending longitudinally relative to slot 188. In the second and third embodiment shift fork assemblies having such blunt edges, relative pivoting movement between the shift rail member and shift fork member about axis 206 includes rolling motion between a blunt edge defined by the generally semi-cylindrical surfaces defining outward portions 228 and 230, or 238 and 240, and the abutting planar surface 202, 204, 208, 210. Movement of pivot axis 206 relative to axis 24 and/or axis 48 will, of course, generally involve relative sliding motion between abutting ones of these interfacing surfaces. This relative sliding movement between the shift rail member and fork member imparting reorientation of the pivot axis 206 relative to the shift rail member.

In a manner similar to that of first embodiment shift fork assembly 120, in the second and third embodiment shift fork assemblies 120a, 120b the sites of abutting contact between a shift fork hub abutment face 196, 197 and a shift rail member slot recess wall segment 198, 200 respectively define an interengaging pair of surfaces 202, 202b, 204, 204b and 208, 208a, 210, 210a that mutually interface in directions substantially parallel with shift rail axis 24.

Fourth embodiment shift fork assembly 120c is substantially identical in its structure, function and assembly method, to any of the above-described first, second and third embodiment shift fork assemblies 120, 120a, 120b except as described below. In shift fork assembly 120c, elements that are significantly modified relative to their respective counterparts in the above embodiment are appended with the suffix "c".

Referring to FIGS. 20-25, fourth embodiment shift fork assembly 120c includes fork member 126c which, other than as described below, may be identical to fork member 126 or 126b. Similarly, fourth embodiment shift fork assembly 120c includes shift rail member 122c which, other than as described below, may be identical to shift fork member 122 or 122a.

Fork member 126c is provided with aperture 180c of diameter that may be larger than that of aperture 180, and having central axis 215c which may be radially offset relative to position of axis 215 but still on second side 179 of fork member central line 178.

In shift fork assembly 120c, stop member 214 is replaced by stop member 250 stamped from a sheet of spring steel. Stop member 250 has central body portion 252 having planar surface 254. The planar reverse side surface 256 of central body portion 252 lies against fork member planar surface 133. Central body portion 252 is flanked by a pair of planar intermediate portions 258, 260 that each extends a distance approximately equal to the width of central body portion surface 254 that extends therebetween. The surfaces 262, 264 of intermediate portions 258, 260, which are on the same side of stop member 250 as central body portion surface 254, are each positioned at an angle θ relative to surface 254 in a range between about 135° and about 175°.

Extending from the outward edges 266, 268 of intermediate portions 258, 260, which are the edges opposite their respective boundaries 270, 272 with central body portion 252, are planar lateral stop portions 274, 276 that each extends a distance approximately equal to the width of intermediate body portion 258, 260. The surfaces 278, 280 of lateral stop portions 274, 276, which are on the same side of stop member 250 as central body portion surface 254, are each positioned at an angle φ relative to its respectively adjoining intermediate portion surface 262, 264 in a range between about 135° and about 175°.

Between intermediate portions 258, 260, central body portion 252 includes a projecting planar tail portion 282 that is coplanar with central body portion 252 and lies alongside fork member surface 133. Extending from the end of central body portion 252 opposite tail portion 282 is planar head portion 284. Planar head portion 284 has a surface 286 on the same side of stop member 250 as central body portion surface 254 that is positioned at an angle ω relative to surface 254 in a range between about 185° and about 225°, and is received in aperture 180d.

Lateral stop portions 274, 276 define stop edges 288, 290 that are aligned to lie in a common imaginary plane. Stop edges 288, 290 interface, and may abut, planar lateral side surface 183 of shift rail member 122c. Intermediate portions 258, 260 define lateral edges 292, 294 that slidably engage the edge 296 of shift rail member slot 188 adjacent fork member surface 133 in further cut-out portion 194. When fork assembly 120c is fully assembled, stop member 250 is compressed between slot edge 296 and fork member side surface 133 and elastically deformed due to its interference fit therebetween. This deflection, in conjunction with head portion 284 being constrained within aperture 180c, tends to hold stop member 250 in an operative position between the fork member and the shift rail member as the fork member pivots about axis 206 and axis 206 itself is adjustably moved as described above.

In shift fork assembly 120c the inserted shift fork member 126c is retained in slot 188 of the shift rail member 122c by the portion of shift rail member body 181 adjacent slot short edge or received portion 212 being captured between the opposing sides of fork member slot or receiving portion 174, as in the above-described embodiments, and by portions of shift rail member body 181 near first axial support recess 190 being captured between fork member shoulder 176 and the stop edges 288, 290 of stop member 250. Thus, a portion of shift rail member body 181 is captured and is moveable between the stop member 250 and the shoulder 176, which each superpose a respective one of the shift rail member body's opposite sides 182, 183; contact therebetween partially limits the relative motion between the shift rail member and shift fork member to being in a range defined between the stop member 250 and the shoulder 176.

Fifth embodiment shift fork assembly 120d is substantially identical in its structure, function and assembly method, to any of the above-described first, second and third embodiment shift fork assemblies 120, 120a, 120b except as described below. In shift fork assembly 120d, elements that are significantly modified relative to their respective counterparts in the above embodiment are appended with the suffix "d".

Referring to FIGS. 26-31, fifth embodiment shift fork assembly 120d includes fork member 126d which, other than as described below, may be identical to fork member 126 or 126b. Similarly, fifth embodiment shift fork assembly 120d includes shift rail member 122d which, other than as described below, may be identical to shift fork member 122 or 122a.

Instead of having aperture 180, fork member 126d is provided with aperture 180d of diameter that may be larger than that of aperture 180, and has central axis 215d which may be located on central line 178 and located in hub 132d relatively nearer fork member fingers 128, 129, positioning aperture 180d approximately centrally between shift rail member slot recesses 190 and 192.

In shift fork assembly 120d, stop member 214 is replaced by stop member 300 which may be an injection molded thermoplastic. Stop member 300 has circular circumferential edges 302, 304 defined on integrally connected, legs 306, 308 separated along axis 310 about which circular edges 302, 304 are centered. Aperture 180d and edges 302, 304 share a substantially identical diameter. Stop member 300 has axially extending head 312 contained within and forming part of the circumference of edges 302, 304, to which legs 306, 308 are integrally connected. Head 312 defines a pair of opposed, coplanar major shoulders 314, 316 that extend axially outward, parallel with axis 310. Major shoulders 314, 316 respectively extend axially outward of stop member 300 from opposed planar axial walls 318, 320 of legs 306, 308 that define circular edges 302, 304. When stop member 300 is installed into aperture 180d, axes 215d and 310 are coincident, the axially outward planar surfaces of walls 318, 320 are parallel and substantially coplanar with shift fork member sides 133, 134, and each major shoulder 314, 316 superposes a shift rail member planar surface 182 or 183.

Respective to each leg 306, 308, diametrically opposed to major shoulders 314, 316 is interfacing, parallel minor shoulder 322, 324 that extends axially outward from its wall 318, 320. Minor shoulders 322 and 324 are coplanar, and separated from their respective, interfacing major shoulder 314, 316 by a distance greater than shift rail member thickness $T_r$. Legs 306, 308 each terminates at a foot 326 on which minor shoulders 322, 324 are formed. An angled surface 328 is formed on each foot, between its minor shoulder 322, 324 and its circumferential edge 302, 304. When stop member 300 is installed into aperture 180d, each minor shoulder 322, 324 superposes a shift rail member planar surface 183 or 182.

Shift fork member 126d differs from shift fork members 126, 126b in that its hub 132d does not include shoulder 176. Rather, it is formed with tail portion 330 on which are carried the first and second axial abutment faces 196, 197 furthest from fingers 128, 129, which may be established on bosses 195 as described above. Stop member 300 is angularly oriented in aperture 180d such that during assembly of fork member 126d to shift rail member 122d, its foot portions 326 are received into slot 188. The edges of slot 188 that define its further cut-out portions 194d at the opposite ends of fork member aperture 180d are substantially parallel and spaced such that major 314, 316 and minor 322, 324 shoulders extend beyond further cut-out portions 194d and superpose fork member planar surfaces 182, 183. As shown, the major shoulders 314, 316 extend a substantial distance axially outward beyond minor shoulders 322, 324.

During assembly of the fork member 126d and shift rail member 122d, once shift rail member slot short edge 212 is received in fork member hub slot 174, as described above, the edges of further cut-out portions 194d slidably engage angled surfaces 328 and elastically deflect foot portions 326 towards each other in directions opposite to arrows 332 (FIG. 29). Once shift rail body 181 has been received between the major and minor shoulders, elastically deflected legs 306, 308 of stop member 300 move axially outwardly in the directions of arrows 332, capturing body 181 between the opposing shoulders of each leg.

Depending of the symmetry of the fork member 126d relative to its central line 178, this configuration would allow it to be inserted into shift rail member slot 188 from either side 182, 183 of its body 181. In other words, tail portion 330 may, if fork member symmetry allows, be rotated to slot 188 of shift rail member 122d from either side of body 181. In such cases, stop member 300 need only be angularly oriented about its axis 310 in aperture 180d such that its foot portions 326 are received into slot 188. As shown in FIGS. 30 and 31, stop member head 312 is disposed on second side 179 of fork member central line 178, which means that shift fork member first finger 128 was inserted into slot 188 in assembling shift fork assembly 120d, contrary to the orientation necessary when assembling the above-described embodiments.

When fork assembly 120d is fully assembled, stop member 300 captures shift rail member body 181 between interfacing major 314, 316 and minor 322, 324 shoulders. The distance between interfacing shoulders in each leg 306, 308 may be larger than body thickness $T_r$, as shown, by an amount suitable to accommodate a suitable degree of fork member pivoting motion about axis 206, and a suitable degree of adjusting motion of axis 206 itself, during shifter operation in the manner described above. Thus, shift rail member planar sides 182, 183 has continuous or temporary abutting contact with the respective interfacing ones of the major and minor shoulders, whereby a portion of shift rail member body 181 is captured and is moveable between the major and minor shoulders of stop member 300, which each superpose a respective one of the shift rail member body's opposite sides 182, 183. Contact between shift rail body 181 and shoulders 322, 324 partially limits the relative motion between the shift rail member and shift fork member to being in a range defined between the shoulders. Those of ordinary skill in the art will recognize that the diameters of aperture 180*d* and circumferential edges 302, 304 may be sized to freely permit their relative pivoting rotation, which may occur during adjustment of axis 206 during shifter operation.

Thus, each of the above-described embodiments of shift fork assembly 120, 120*a*, 120*b*, 120*c*, 120*d* includes a fork member carried by a shift rail member that has movement along shift rail member axis 24, one of the fork member and the shift rail member being pivotably mounted in a slot (e.g., slot 188) defined in the other of the fork member and the shift rail member. The fork member is adapted to induce movement of control ring 44 to which is its operably engaged along gear axis 48 substantially parallel to the shift rail member axis 24. The fork member and shift rail member have relative movement that accommodates wobbling movement of the shift control ring 44 during the time when it moves the shift control ring 44 towards or away from a gear position, thereby solving the aforementioned problems associated with prior fork assemblies such as above-described prior shift fork assembly 20, in which shift fork structure 26 is pivotably and slidably mounted on cylindrical shift rail member 22. This accommodation is achieved by the fork member having pivoting motion about an axis 206 extending between and intersecting at least one of the shift rail member axis 24 and the gear axis 48, and the axis itself being adjustable relative to axis 24 and/or axis 48.

The invention has been described in an illustrative manner, and it is to be understood that the terminology which has been used is intended to be in the nature of words of description rather than of limitation.

Those of ordinary skill in the art will appreciate that many modification and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

The invention claimed is:

1. A shift fork assembly comprising:
   a shift rail member having a slot defined therein and a shift rail axis along which the shift rail member has axial movement, the shift rail member having a pair of opposing first and second wall segments extending in a direction substantially perpendicular to the shift rail axis and a pair of opposing faces extending in a direction parallel to the shift rail axis, with each pair of the first and second wall segments connected to one of the faces to define the slot as an aperture extending entirely through the shift rail member between top and bottom surfaces of the shift rail member; and
   a fork member mounted in the slot and carried by the shift rail member, the fork member and shift rail member having movement relative to each other, the fork member adapted to operatively engage a control ring and induce movement of the control ring along a gear axis substantially parallel to the shift rail axis with movement of the shift rail member;
   wherein the fork member has pivoting motion relative to the shift rail member about a pivot axis that extends substantially perpendicularly relative to the shift rail axis, and the pivot axis is adapted to extend substantially between the shift rail axis and the gear axis;
   wherein the fork member extends through the slot between the top and bottom surfaces, and the fork member and the first wall segments and the second wall segments of the slot define interengaging surfaces that mutually interface in directions substantially parallel with the shift rail axis.

2. A shift fork assembly according to claim 1, wherein the slot is elongate and longitudinally extends in a direction substantially perpendicular to the shift rail axis.

3. A shift fork assembly according to claim 1, wherein the shift rail member and shift fork member have a position relative to each other in which the pivot axis is adapted to intersect at least one of the shift rail member axis and the gear axis.

4. A shift fork assembly according to claim 1, wherein the shift rail member has a thickness between substantially parallel planar surfaces traversed by the slot.

5. A shift fork assembly according to claim 1, wherein the fork member and the shift rail member have relative sliding movement between the interengaging surfaces, reorientation of the pivot axis relative to the shift rail member imparted by the relative sliding movement.

6. A shift fork assembly according to claim 1, wherein at least one of the interengaging surfaces is substantially planar.

7. A shift fork assembly according to claim 1, wherein one of the interengaging surfaces is substantially peaked or convex.

8. A shift fork assembly according to claim 1, wherein one of the interengaging surfaces defines one of a prism and a generally semi-cylindrical surface.

9. A shift fork assembly according to claim 1, wherein pivoting motion of the fork member about the pivot axis relative to the shift rail member includes one of fulcruming and rolling motion between the fork member and the shift rail member within the slot.

10. A shift fork assembly according to claim 1, wherein pivoting motion of the fork member about the pivot axis relative to the shift rail member includes one of fulcruming and rolling motion between the interengaging surfaces.

11. A shift fork assembly according to claim 1, wherein both of the interengaging surfaces are substantially planar.

12. A shift fork assembly according to claim 1, further comprising a stop member at all times engaged with a first one of the fork member and the shift rail member, and wherein the relative movement between the fork member and the shift rail member is partially limited by stop member contact with the second one of the fork member and the shift rail member.

13. A shift fork assembly according to claim 12, wherein the fork member has an aperture in which a portion of the stop member is disposed, and in which the stop member is at all times engaged with the fork member.

14. A shift fork assembly according to claim 12, wherein relative movement between the shift rail member and shift fork member is partially limited by stop member contact with the shift rail member.

15. A shift fork assembly according to claim 12, wherein the fork member includes a shoulder, a portion of the shift rail member is disposed between the stop member and the shoulder, and shift rail member movement relative to the fork member is partially limited to being within a range defined between the stop member and the shoulder.

16. A shift fork assembly according to claim 15, wherein the portion of the shift rail member disposed between the stop member and the shoulder has first and second opposite sides one of which is superposed by the stop member, and relative movement between the fork member and the shift rail member is partially limited by contact of the stop member and contact of the shoulder each with a respective one of the shift rail member portion opposite sides.

17. A shift fork assembly according to claim 12, wherein the stop member is a formed sheet of spring steel disposed in the slot and against which the fork member and the shift rail member both bear.

18. A shift fork assembly according to claim 17, wherein the stop member is elastically deformed between the fork member and the shift rail member, whereby the stop member is maintained in an operative position.

19. A shift fork assembly according to claim 12, wherein the shift rail member has first and second opposite sides, and relative movement between the fork member and the shift rail member is partially limited by stop member contact with at least one of the first and second shift rail member opposite sides.

20. A shift fork assembly according to claim 12, wherein the fork member has a side surface in which the aperture is located, the stop member includes a head and a foot defining interfacing stop member shoulders that project from the fork member side surface and between which a portion of the shift rail member is disposed, and relative movement between the fork member and the shift rail member is partially limited by contact between at least one of the stop member shoulders and its respectively interfacing one of the first and second shift rail member opposite sides.

21. The shift fork assembly according to claim 1, wherein the fork member includes a receiving fork member slot, and wherein the receiving fork member slot is interfit with one of said pair of opposing faces.

\* \* \* \* \*